(12) United States Patent
Watanabe

(10) Patent No.: US 11,153,509 B2
(45) Date of Patent: Oct. 19, 2021

(54) DISTRIBUTION ASSISTANCE APPARATUS AND DISTRIBUTION ASSISTANCE METHOD

(71) Applicant: Roland Corporation, Shizuoka (JP)

(72) Inventor: Masakazu Watanabe, Shizuoka (JP)

(73) Assignee: Roland Corporation, Shizuoka (JP)

(*) Notice: Subject to any disclaimer, the term of this patent is extended or adjusted under 35 U.S.C. 154(b) by 0 days.

(21) Appl. No.: 16/796,914

(22) Filed: Feb. 20, 2020

(65) Prior Publication Data

US 2021/0168303 A1   Jun. 3, 2021

(30) Foreign Application Priority Data

Nov. 28, 2019   (JP) ............... JP2019-215468

(51) Int. Cl.
| | | |
|---|---|---|
| *H04N 5/268* | (2006.01) | |
| *H04R 1/04* | (2006.01) | |
| *H04N 5/265* | (2006.01) | |
| *H04R 3/04* | (2006.01) | |
| *H04R 5/033* | (2006.01) | |
| *H04R 5/04* | (2006.01) | |

(52) U.S. Cl.
CPC ............. *H04N 5/268* (2013.01); *H04N 5/265* (2013.01); *H04R 1/04* (2013.01)

(58) Field of Classification Search
None
See application file for complete search history.

(56) References Cited

U.S. PATENT DOCUMENTS

| | | | | |
|---|---|---|---|---|
| 2002/0099458 | A1* | 7/2002 | Rudolph ............... | H04H 60/04 700/94 |
| 2008/0117933 | A1* | 5/2008 | Castiglione ........... | H04H 20/28 370/487 |
| 2010/0303260 | A1* | 12/2010 | Stieler Von Heydekampf ........... H04H 60/04 381/119 | |
| 2014/0321834 | A1* | 10/2014 | Segal ..................... | H04N 5/265 386/282 |
| 2016/0111093 | A1* | 4/2016 | Desineni ............... | G06F 15/163 700/94 |
| 2019/0212971 | A1* | 7/2019 | Kawano ................. | G06F 3/165 |

OTHER PUBLICATIONS

Photo Savings, "Tascam MiniStudio Creator US-42 Review/tutorial". https://www.youtube.com/watch?v=S2TQ53C6ral. Published: Jan. 28, 2019. (Year: 2019).*

Tascam, the instruction manual of " MiNiSTUDIO Creator US-42," available at <https://tascam.jp/downloads/products/tascam/US-32_us-42/E_US-42_OM_vE.pdf>, retrieved on Feb. 14, 2020, pp. 1-30.

* cited by examiner

*Primary Examiner* — Qin Zhu
(74) *Attorney, Agent, or Firm* — JCIPRNET

(57) ABSTRACT

A distribution assistance apparatus and a distribution assistance method are provided. An input and output IF mixes a sound input from an HS microphone or a built-in microphone with a sound signal of distribution data received from a portable terminal and outputs the sound. Even when an addition process or an effect is applied to distribution data in the portable terminal, a sound input from the HS microphone or the built-in microphone can be output through a monitor at that point in time without causing a latency.

18 Claims, 13 Drawing Sheets

| | addition button 3a, 32a | addition button 3b, 32b | addition button 3c, 32c | addition button 3d, 32d | addition button 3e, 32e | addition button 3f, 32f |
|---|---|---|---|---|---|---|
| state | OFF | ON | OFF | OFF | OFF | ON |
| addition process | BGM1 | moving image 1 | sound effect 1 | still image 1 | sound effect 2 | text 1 |

DISTRIBUTION ASSISTANCE APPARATUS AND DISTRIBUTION ASSISTANCE METHOD

CROSS-REFERENCE TO RELATED APPLICATION

This application claims the priority of Japan patent application serial no. 2019-215468, filed on Nov. 28, 2019. The entirety of the above-mentioned patent application is hereby incorporated by reference herein and made a part of this specification.

BACKGROUND

Technical Field

The present disclosure relates to a distribution assistance apparatus which is capable of easily performing Internet distribution using a distribution apparatus such as a portable terminal, such as a mobile phone or a tablet, or a personal computer (hereinafter, referred to as a "PC").

Description of Related Art

In recent years, live distribution via the Internet has been booming. Live distribution is performed through a portable terminal such as a mobile phone or a tablet, a PC, or the like capable of being connected to the Internet. In live distribution, distribution has been enhanced by mixing in sound effects such as clapping and drum rolls and mixing in BGM, moving images, and still images with the talk of a broadcaster.

An instruction manual for TASCAM "MiNiSTUDIO CREATOR US-42" of Patent Document 1 is an instruction manual for such a live distribution apparatus (audio interface).

The live distribution apparatus is provided with an EFFECT button that imparts an acoustic effect to an input sound and a PON button that outputs a sound effect. When the EFFECT button is operated, a sound effect corresponding to the operation is applied to a sound input to the live distribution apparatus through a microphone or the like in the live distribution apparatus. A sound signal having an acoustic effect applied thereto is output to a PC or the like and is distributed to the Internet via a PC or the like. In addition, when the PON button is pressed, a sound effect which is allocated to the PON button in advance and built into the live distribution apparatus is output to a PC or the like and is distributed to the Internet via a PC or the like.

PATENT DOCUMENTS

[Patent Document 1] Instruction Manual for TASCAM "MiNiSTUDIO CREATOR US-42"

SUMMARY

According to an embodiment of the disclosure, there is provided a distribution assistance apparatus that instructs a distribution apparatus connected to an Internet and performing Internet distribution of a sound or a video to perform various distribution instructions and performs Internet distribution using the distribution apparatus, the distribution assistance apparatus including a sound input unit that inputs a sound, a sound transmission unit that transmits the sound input to the sound input unit to the distribution apparatus, an effect instruction unit that instructs the distribution apparatus to apply effect processing on the sound transmitted from the sound transmission unit to the distribution apparatus and perform Internet distribution of the sound, a sound reception unit that receives a sound signal on which effect processing has been performed by the distribution apparatus in response to an instruction of the effect instruction unit, and a sound output unit that outputs the sound signal received by the sound reception unit and the sound input to the sound input unit from the distribution assistance apparatus.

In addition, according to another embodiment of the disclosure, there is provided a distribution assistance method executed by a distribution assistance apparatus that instructs a distribution apparatus connected to an Internet and performing Internet distribution of a sound or a video to perform various distribution instructions and performs Internet distribution using the distribution apparatus, the distribution assistance method including a sound input step of inputting a sound, a sound transmission step of transmitting the sound input through the sound input step to the distribution apparatus, an effect instruction step of instructing the distribution apparatus to apply effect processing on the sound transmitted to the distribution apparatus through the sound transmission step and perform Internet distribution of the sound, a sound reception step of receiving a sound signal on which effect processing has been performed by the distribution apparatus in response to an instruction given through the effect instruction step, and a sound output step of outputting the sound signal received through the sound reception step and the sound input through the sound input step from the distribution assistance apparatus.

DESCRIPTION OF THE EMBODIMENTS

However, since an acoustic effect using an EFFECT button is applied in the conventional live distribution apparatus by a program built into the live distribution apparatus in advance, and a sound effect using a PON button is built into the live distribution apparatus in advance, the degree of freedom of the acoustic effects or the sound effects is low. In addition, the live distribution apparatus is complicated, and the cost of the apparatus is high.

Consequently, the applicant of the present application has contrived to output a signal indicating which button has been operated to a PC or the like from a distribution assistance apparatus and generate an acoustic effect or a sound effect in a PC and distribute the acoustic effect or the sound effect through the Internet without contriving to build a program for applying an acoustic effect or build a sound effect into a distribution assistance apparatus that assists live distribution through the Internet (not public yet).

However, when a sound input to the live distribution apparatus through a microphone or the like is output to a PC, an acoustic effect is applied to the sound in the PC, and the sound having the acoustic effect applied thereto is distributed to the Internet, fed back to the live distribution apparatus, and output to a monitor, latency (delay) occurs in the output to the monitor, thereby resulting in a problem that a broadcaster (microphone input person) feels uncomfortable.

The disclosure provides a distribution assistance apparatus and a distribution assistance method which are capable of performing monitor output without causing latency even when an acoustic effect is applied to an input sound in a distribution apparatus such as a PC.

Figure 1A:
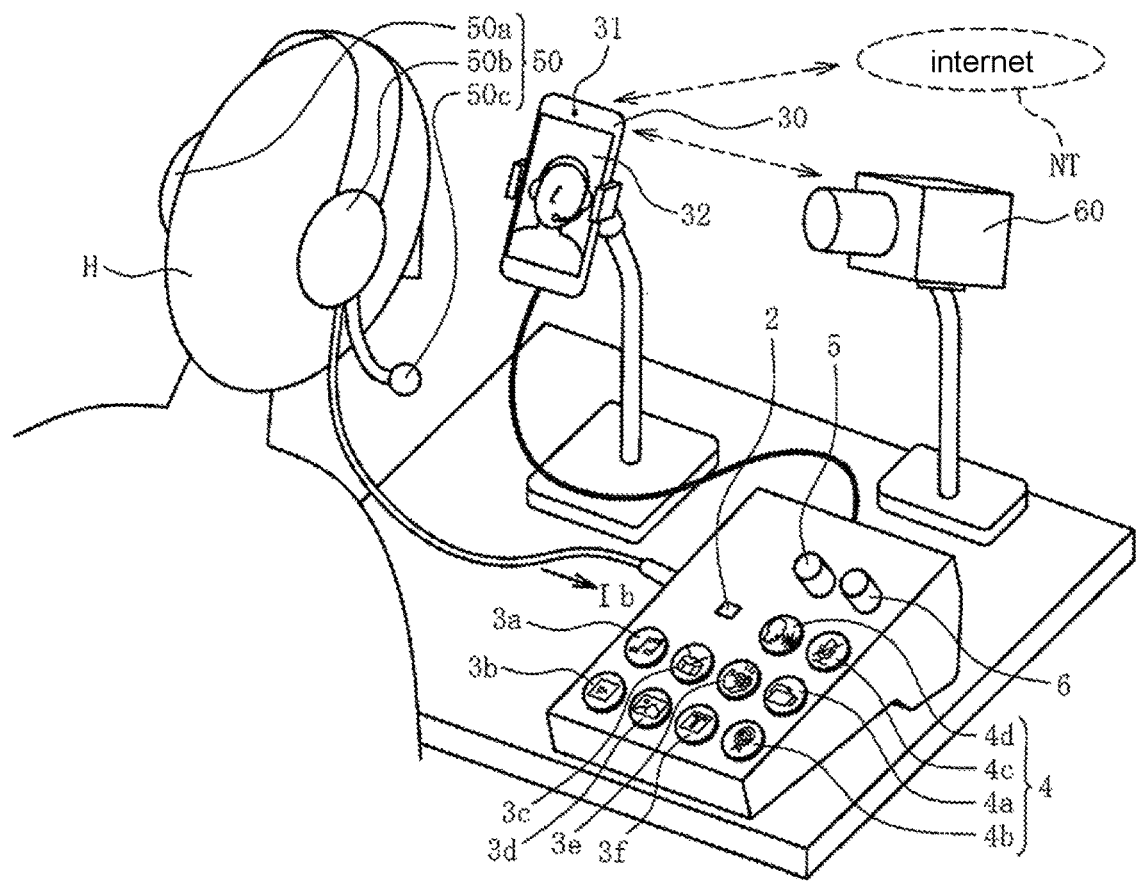
FIG. 1(a) is a diagram showing the appearance of an input and output IF and a portable terminal according to an embodiment.
Figure 1B:
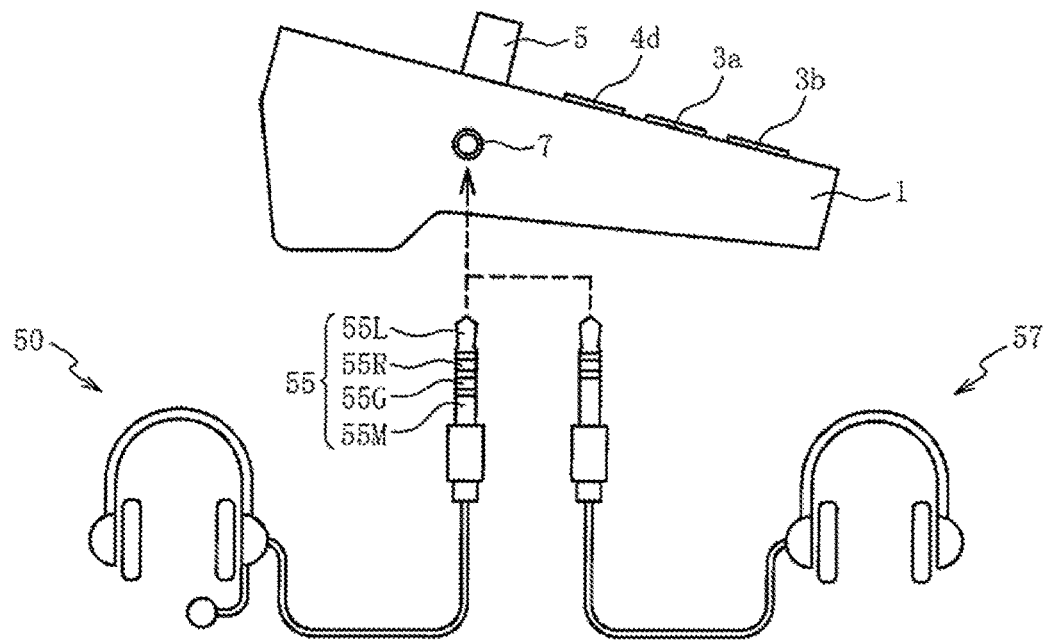
FIG. 1(b) is a side view of the input and output IF in a direction of Ib in FIG. 1(a).

Hereinafter, preferred examples will be described with reference to the accompanying drawings. FIG. 1(a) is a diagram showing the appearance of an input and output interface 1 (hereinafter, abbreviated to an "input and output IF 1") and a portable terminal 30 according to an embodiment, and FIG. 1(b) is a side view of the input and output IF 1 in a direction of Ib in FIG. 1(a).

The input and output IF 1 is an apparatus (a distribution assistance apparatus, a signal processing apparatus) that transmits a sound input from a built-in microphone 2 or a headset 50 to be described later to a portable terminal 30 and outputs a sound of distribution data to be described later and input to the input and output IF 1 from the portable terminal 30 to the headset 50. The input and output IF 1 is provided with a built-in microphone 2 that inputs a sound, addition buttons 3a to 3f, an operation button 4, an addition sound volume knob 5, a microphone sound volume knob 6, and a jack 7 into which a plug 55 of the headset 50 to be described later is inserted.

The addition buttons 3a to 3f are operators that instruct the portable terminal 30 to apply an addition process of adding a sound effect, BGM, or the like to a sound input by the input and output IF 1. An addition process such as a sound effect, BGM, a still image, a moving image, or a character string (text) is allocated to each of the addition buttons 3a to 3f (see FIG. 2(b)).

The operation button 4 is an operator that instructs various operations other than an addition process, and includes a camera switching button 4a, a distribution start button 4b, a mute button 4c, and an effect button 4d. The camera switching button 4a is an operator that transmits camera switching information which is an instruction for switching an acquisition destination of image acquisition in the portable terminal 30 to the portable terminal 30. The camera switching information is provided with three setting values of "image acquisition from a built-in camera 31", "image acquisition from an external camera 60", and "image acquisition is not performed", and these setting values are switched between and transmitted to the portable terminal 30 every time the camera switching button 4a is pressed.

The distribution start button 4b is an operator that transmits a start instruction and a termination instruction for distribution to the Internet NT to the portable terminal 30, and the mute button 4c is an operator that mutes a sound volume of a sound which is input from the built-in microphone 2 or the headset 50. The effect button 4d is an operator that transmits effect instruction information for instructing the addition of an effect (acoustic effect) such as a delay or a delay or a reverb to a sound which is input from the input and output IF 1 to the portable terminal 30.

The addition sound volume knob 5 is an operator that sets an addition sound volume which is a sound volume of an addition process which is instructed by the addition buttons 3a to 3f, and the microphone sound volume knob 6 is an operator that sets a sound volume of a sound which is input from the built-in microphone 2 or the headset 50 to be described later.

The portable terminal 30 is an information processing apparatus (distribution apparatus) which is connected to the input and output IF 1 and includes a built-in camera 31 acquiring an image (video) of a user H or the like and an LCD 32 that outputs an image, and a smartphone is an example of the portable terminal 30. The external camera 60 acquiring an image and different from that of the built-in camera 31, and the Internet NT are connected to the portable terminal 30 through wireless communication.

The portable terminal 30 creates distribution data in which the above-described addition process or the like are added to an image acquired from the built-in camera 31 or the external camera 60 and a sound which is input from the input and output IF 1. The created distribution data is transmitted (distributed) to the Internet NT and is output to the input and output IF 1, and an image of distribution data is displayed on the LCD 32 of the portable terminal 30.

The headset 50 is a sound input and output apparatus which is connected to the input and output IF 1, and is provided with a left speaker 50a and a right speaker 50b which output a sound, a headset microphone 50c (hereinafter, abbreviated to an "HS microphone 50c") which inputs a sound, and the plug 55. The plug 55 is a terminal of a cellular telephone industry association (CTIA) standard, and is provided with a left terminal 55L to which the left speaker 50a is connected from a tip end thereof, a right terminal 55R to which the right speaker 50b is connected, a ground terminal 55G to which a ground GND (see FIG. 3(a)) is connected, and a microphone terminal 55M to which the HS microphone 50c is connected.

The input and output IF 1 is also configured such that a headphone 57 formed by omitting the microphone 50c from the headset 50 is also usable. In a case where the headphone 57 is connected to the input and output IF 1, a sound of the user H or the like is input from the built-in microphone 2 of the input and output IF 1 instead of the HS microphone 50c.

Figures 2A, 2B:
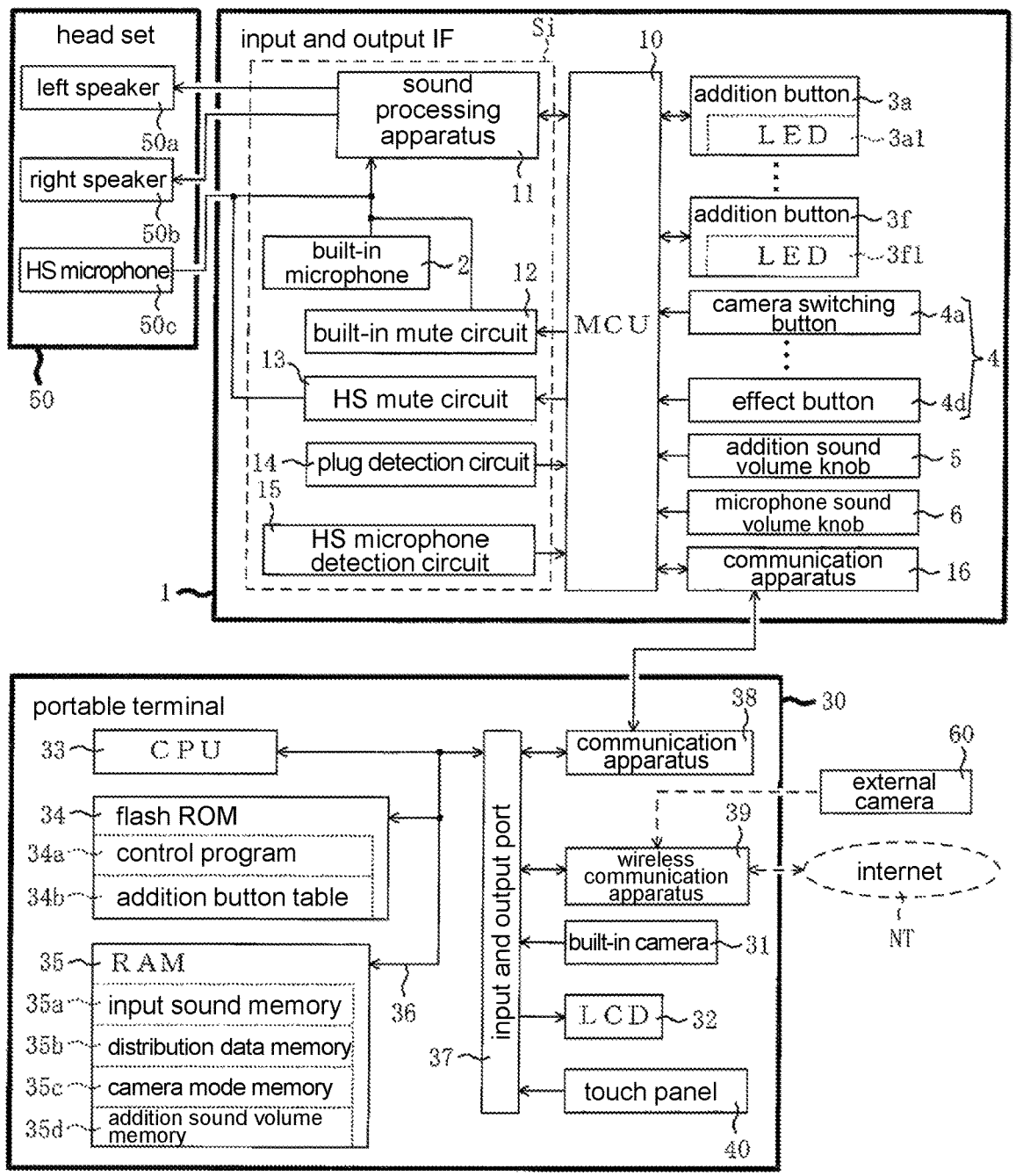
FIG. 2(a) is a block diagram showing electrical configurations of an input and output IF and a portable terminal.
FIG. 2(b) is a schematic diagram showing an addition process table.

Next, electrical configurations of the input and output IF 1 and the portable terminal 30 will be described with reference to FIGS. 2(a) and 2(b) to FIGS. 5(a) and 5(b). FIG. 2(a) is a block diagram showing electrical configurations of the input and output IF 1 and the portable terminal 30. The input and output IF 1 includes an MCU 10 which is an arithmetic apparatus that controls each unit thereof, and a sound processing apparatus 11, a built-in mute circuit 12, an HS mute circuit 13, a plug detection circuit 14, an HS microphone detection circuit 15, the addition buttons 3a to 3f, the operation button 4, the addition sound volume knob 5, the microphone sound volume knob 6, and a communication apparatus 16 for communicating with the portable terminal 30 (specifically, a communication apparatus 38 to be described later) are connected to the MCU 10.

The sound processing apparatus 11 is an apparatus that controls the input and output of a sound signal. The left speaker 50a, the right speaker 50b, and the HS microphone 50c of the headset 50 are connected to the sound processing apparatus 11 through the left terminal 55L, the right terminal 55R, and the microphone terminal 55M (see FIG. 1(b)) of the plug 55, and the built-in microphone 2 is also connected thereto.

The built-in mute circuit 12 is a circuit that mutes the built-in microphone 2 by blocking a sound signal from the built-in microphone 2 on the basis of an instruction given from the MCU 10, and the HS mute circuit 13 is a circuit that mutes the HS microphone 50c by blocking a sound signal from the HS microphone 50c on the basis of an instruction given from the MCU 10. The plug detection circuit 14 is a circuit that detects the insertion of the plug 55 into the input and output IF 1, and the HS microphone detection circuit 15 is a circuit that detects the connection of a microphone contact point CM in the jack 7 to be described later.

A circuit constituted by the built-in microphone 2, the sound processing apparatus 11, the built-in mute circuit 12, the HS mute circuit 13, the plug detection circuit 14, and the HS microphone detection circuit 15 is a sound input circuit Si. Here, details of the sound input circuit Si will be described with reference to FIGS. 3(a) and 3(b) and FIGS. 4(a) and 4(b).

Figure 3A:
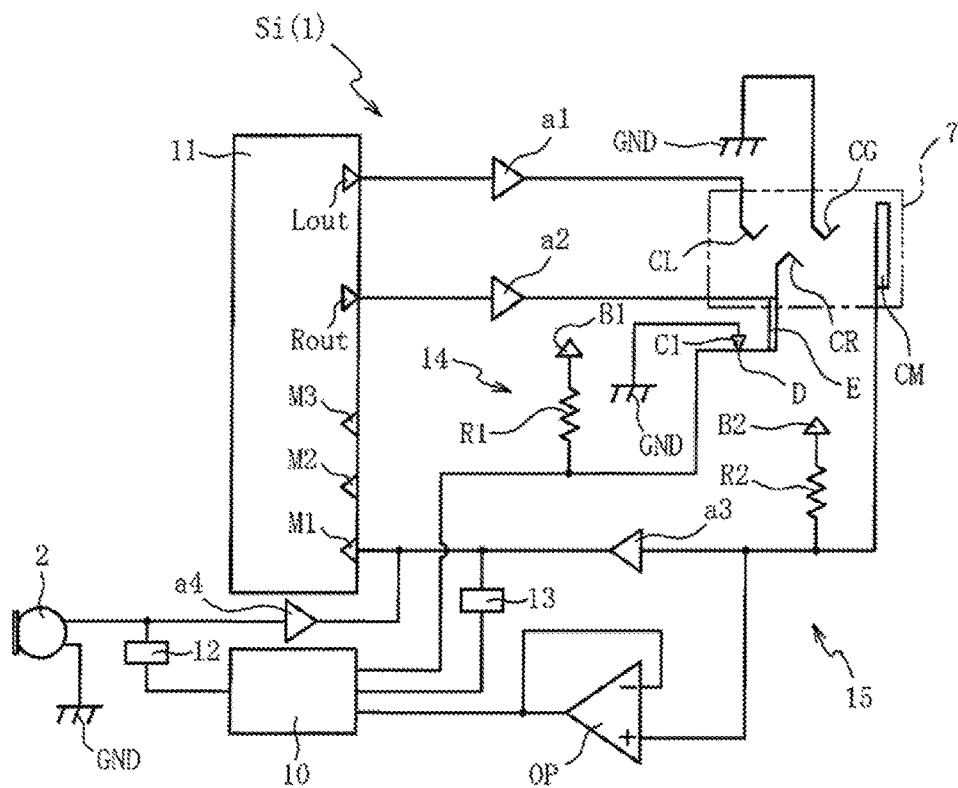
FIG. 3(a) is a circuit diagram of a sound input circuit.
Figure 3B:
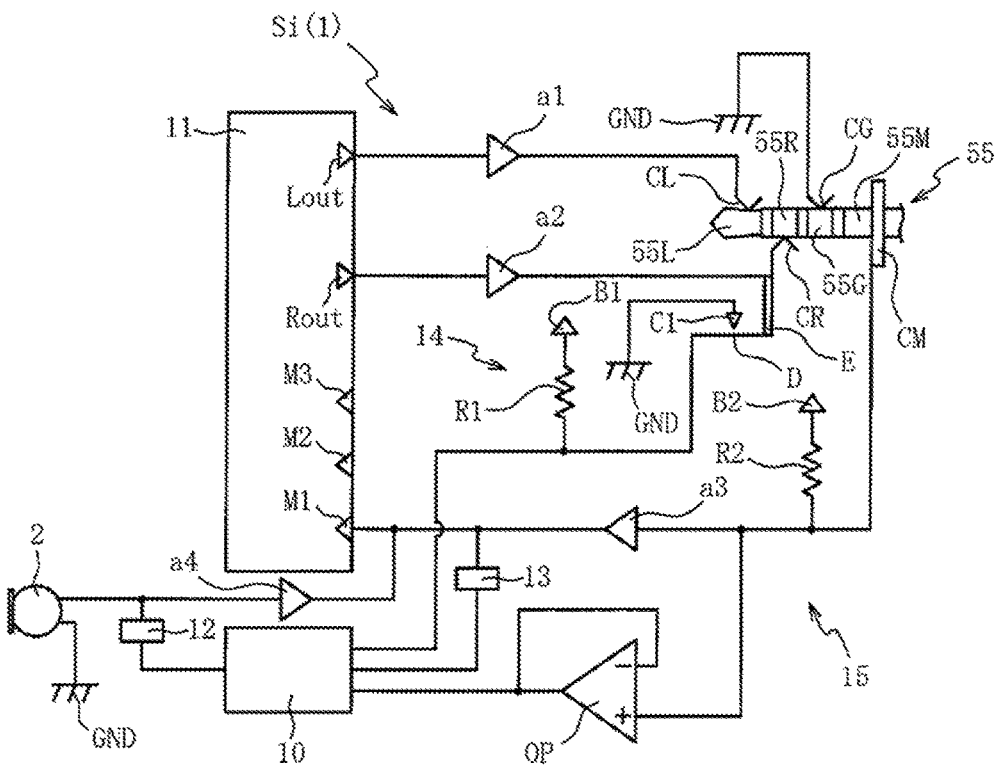
FIG. 3(b) is a circuit diagram of a sound input circuit in a case where a plug is inserted.

FIG. 3(a) is a circuit diagram showing the sound input circuit Si, and FIG. 3(b) is a circuit diagram showing the sound input circuit Si in a case where the plug 55 is inserted. As shown in FIG. 3(a), the sound input circuit Si mainly includes the jack 7, the built-in microphone 2, the MCU 10, the sound processing apparatus 11, the built-in mute circuit 12, and the HS mute circuit 13.

The jack 7 is provided with a left contact point CL to be connected to the left terminal 55L of the plug 55, a right contact point CR to be connected to the right terminal 55R, a ground contact point CG to be connected to the ground terminal 55G and a ground GND, and the microphone contact point CM to be connected to the microphone terminal M.

The sound processing apparatus 11 is provided with a left output port Lout and a right output port Rout which are output ports from which left and right sound signals are output, and a first input port M1, a second input port M2, and a third input port M3 which are input ports to which a sound signal is input. In the present embodiment, the built-in microphone 2 and the microphone contact point CM are connected to the first input port M1, and the built-in microphone 2, the microphone contact point CM, and other input apparatuses are not connected to the second input port M2 and the third input port M3.

The left output port Lout of the sound processing apparatus 11 is connected to the left contact point CL of the jack 7 through an amplifier a1, and the right output port Rout of the sound processing apparatus is connected to the right contact point CR through an amplifier a2. Thereby, sound signals from the left output port Lout and the right output port Rout of the sound processing apparatus 11 are output to the left terminal 55L and the right terminal 55R.

The microphone contact point CM of the jack 7 is connected to the first input port M1 of the sound processing apparatus 11 through an amplifier a3. An amplifier a4 is connected to the built-in microphone 2, and the amplifier a4 is further connected between the amplifier a3 and the first input port M1. Thereby, sound signals from the microphone terminal 55M of the plug 55 and the built-in microphone 2 are input to the first input port M1.

The right contact point CR of the jack 7 is mechanically connected to a terminal D through an insulator E. The terminal D is connected to the MCU 10, and a bias voltage B1 (for example, 3.3 V) is connected between the terminal D and the MCU 10 through a resistor R1. In addition, a contact point C1 to be connected to the ground GND is disposed on the terminal D. As shown in FIGS. 3(a) and 3(b), the contact point C1 is configured to come into contact with the terminal D in a case where the plug 55 is removed and the right contact point CR does not come into contact with the plug 55, and is configured not to come into contact with the terminal D in a case where the plug 55 is inserted and the right contact point CR comes into contact with the plug 55.

Therefore, in a case where the plug 55 is removed from the jack 7, the contact point C1 comes into contact with the terminal D, so that a voltage from the bias voltage B1 is input to the ground GND through the terminal D and the contact point C1, and a voltage of "low" is input to the MCU 10. On the other hand, in a case where the plug 55 is inserted into the jack 7, the contact point C1 does not come into contact with the terminal D, and the terminal D is blocked from the ground GND, so that a voltage of "high" from the bias voltage B1 is input to the MCU 10. In this case, since the right contact point CR, the terminal D, and the MCU 10 are electrically connected by the insulator E, a voltage from the right contact point CR is not input to the MCU 10, and a voltage from the bias voltage B1 is not input to the right contact point CR through the terminal D.

Further, in the MCU 10, it is possible to determine whether or not the plug 55 has been inserted by confirming whether a voltage from the bias voltage B1 is high or low. Such a detection circuit constituted by the resistor R1, the bias voltage B1, and the contact point C1 corresponds to the "plug detection circuit 14" in FIG. 2(a).

A bias voltage B2 (for example, 2.5 V) is connected between the microphone contact point CM and the amplifier a3 through a resistor R2. Further, connection points of the amplifier a3 and the resistor R2 are connected to the MCU 10 through an operational amplifier OP. In a case where the HS microphone 50c (see FIGS. 1(a) and 1(b) and FIG. 2(a)) is included and the plug 55 includes the microphone terminal M, the microphone terminal M is connected to the microphone contact point CM of the jack 7. In this case, a voltage from the bias voltage B2 is divided into the resistor R2 and an impedance of the HS microphone 50c and input to the MCU 10.

On the other hand, in the plug 55 in a case where the HS microphone 50c is not included, the ground terminal 55G of the plug 55 is integrated with the microphone terminal 55M and is set to be in a short-circuit state, and thus the ground terminal 55G is connected to the ground contact point CG of the jack 7 and is also connected to the microphone contact point CM. Therefore, a voltage which is input from the bias voltage B2 to the MCU 10 is set to 0 V.

Therefore, it is possible to detect whether or not the HS microphone 50c is included, that is, whether or not the microphone terminal M has come into contact with the microphone contact point CM by determining whether or not the value of a voltage to be input to the MCU 10 from the bias voltage B2 exceeds a threshold value (for example, 1.0 V). Such a detection circuit constituted by the resistor R2 and the bias voltage B2 corresponds to the "HS microphone detection circuit 15" in FIG. 2(a).

In addition, the built-in mute circuit 12 is connected between the built-in microphone 2 and the amplifier a4, and the HS mute circuit 13 is connected between the amplifier a3 and the first input port M1. The built-in mute circuit 12 and the HS mute circuit 13 are connected to the MCU 10. Details of the built-in mute circuit 12 and the HS mute circuit 13 will be described with reference to FIG. 4(a).

Figure 4A:
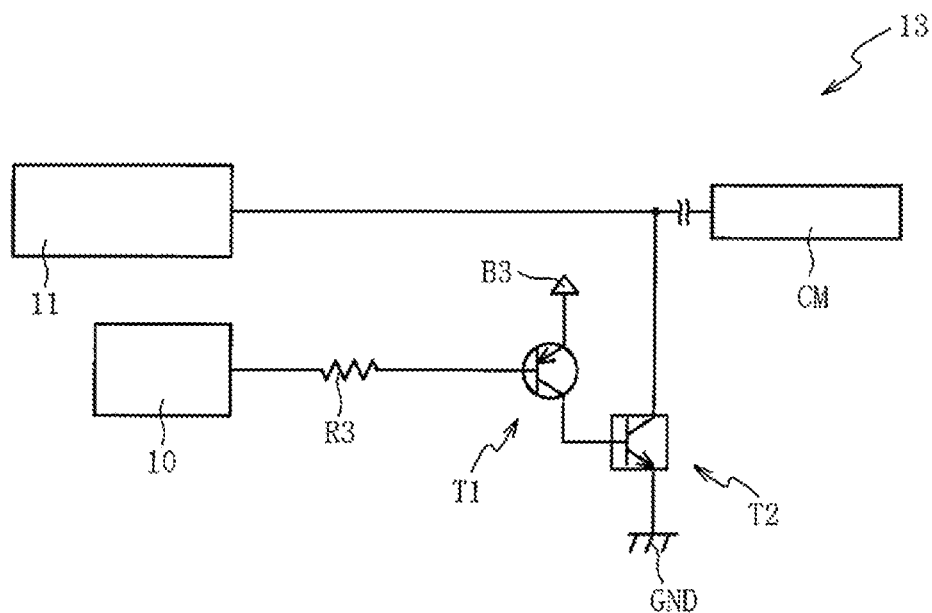
FIG. 4(a) is a circuit diagram of an HS mute circuit.

FIG. 4(a) is a circuit diagram of the HS mute circuit 13. Meanwhile, since the built-in mute circuit 12 and the HS mute circuit 13 have the same configuration, only the HS mute circuit 13 will be described below, and the built-in mute circuit 12 will not be described. The HS mute circuit 13 is constituted by a resistor R3, a bias voltage B3 (for example, 3.3 V), a transistor T1, and a transistor T2.

The MCU 10 is connected to a base of the transistor T1 through the resistor R3. The bias voltage B3 is connected to an emitter of the transistor T1, and a collector of the transistor T1 is connected to a base of the transistor T2. A collector of the transistor T2 is connected between the microphone contact point CM of the jack 7 and the first input port M1 of the sound processing apparatus 11 (specifically, between the amplifier a3 and the first input port M1 in FIG. 3(a)), and an emitter of the transistor T2 is connected to the ground GND.

In the HS mute circuit 13 configured in this manner, when a low voltage is applied to the base of the transistor T1 from the MCU 10, a voltage from the bias voltage B3 is input to the base of the transistor T2 through the collector and the emitter of the transistor T1. Then, a sound signal which is input from the microphone contact point CM is input to the ground GND through the collector and the emitter of the transistor T2. Thereby, a sound signal which is input from the microphone contact point CM is blocked from the first input port M1. On the other hand, in a case where a voltage is not input to the base of the transistor T1 from the MCU 10, a sound signal from the microphone contact point CM is input to the first input port M1.

In this manner, since the HS mute circuit 13 is configured to be able to block only a sound signal which is input from the microphone contact point CM, other inputs and outputs of the built-in microphone 2 or the like with respect to the sound processing apparatus 11 are not affected even when the input and blocking of a sound signal of the microphone contact point CM with respect to the first input port M1 are switched between by the HS mute circuit 13. Similarly, since the built-in mute circuit 12 is also configured to be able to block only a sound signal which is input from the built-in microphone 2, other inputs and outputs with respect to the sound processing apparatus 11 are not affected even when the input and blocking of a sound signal from the built-in microphone 2 with respect to the first input port M1 are switched between.

Figure 4B:
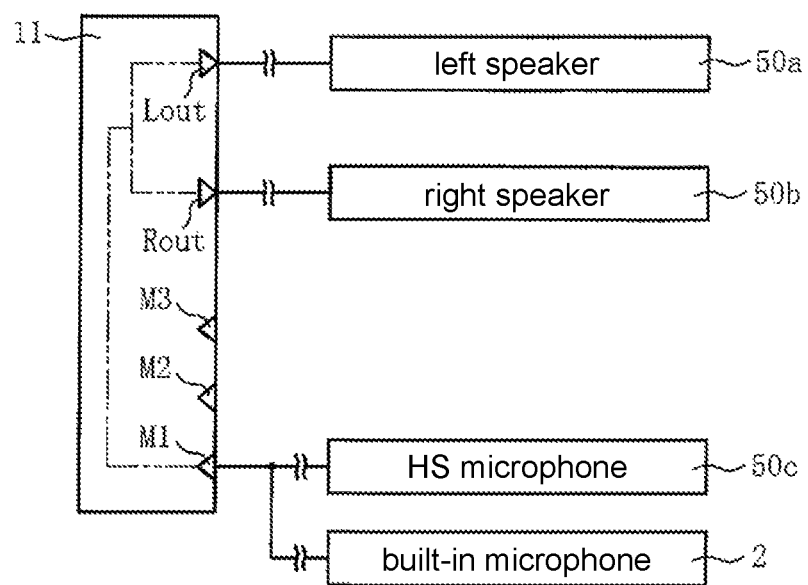
FIG. 4(b) is a schematic diagram showing a sound processing apparatus.

Next, an input and output relationship between the first input port M1 of the sound processing apparatus 11 and the left and right output ports Lout and Rout will be described with reference to FIG. 4(b). FIG. 4(b) is a schematic diagram showing the sound processing apparatus 11. As shown in FIG. 4(b), the sound processing apparatus 11 in the present embodiment is configured such that a sound signal from the first input port M1 can be output from the left output port Lout and the right output port Rout. Thereby, a sound which is input from the HS microphone 50c of the headset 50 can be immediately output from the left speaker 50a and the right speaker 50b.

In addition, although not shown in the drawing, in the sound processing apparatus 11, the left output port Lout and the right output port Rout are configured to be able not only to output a sound signal which is input from the first input port M1 but also to output a mixture of other sound signals, for example, a sound signal of distribution data received from the portable terminal 30 to be described later and a sound signal which is input from the first input port M1.

In this manner, in a case where the insertion of the plug 55 into the jack 7 is incomplete when a sound signal from the first input port M1 can be output from the left output port Lout and the right output port Rout, noise from the left speaker 50a and the right speaker 50b of the headset 50 may be output. A mechanism of generation of such noise will be described with reference to FIGS. 5(a) and 5(b).

Figure 5A:
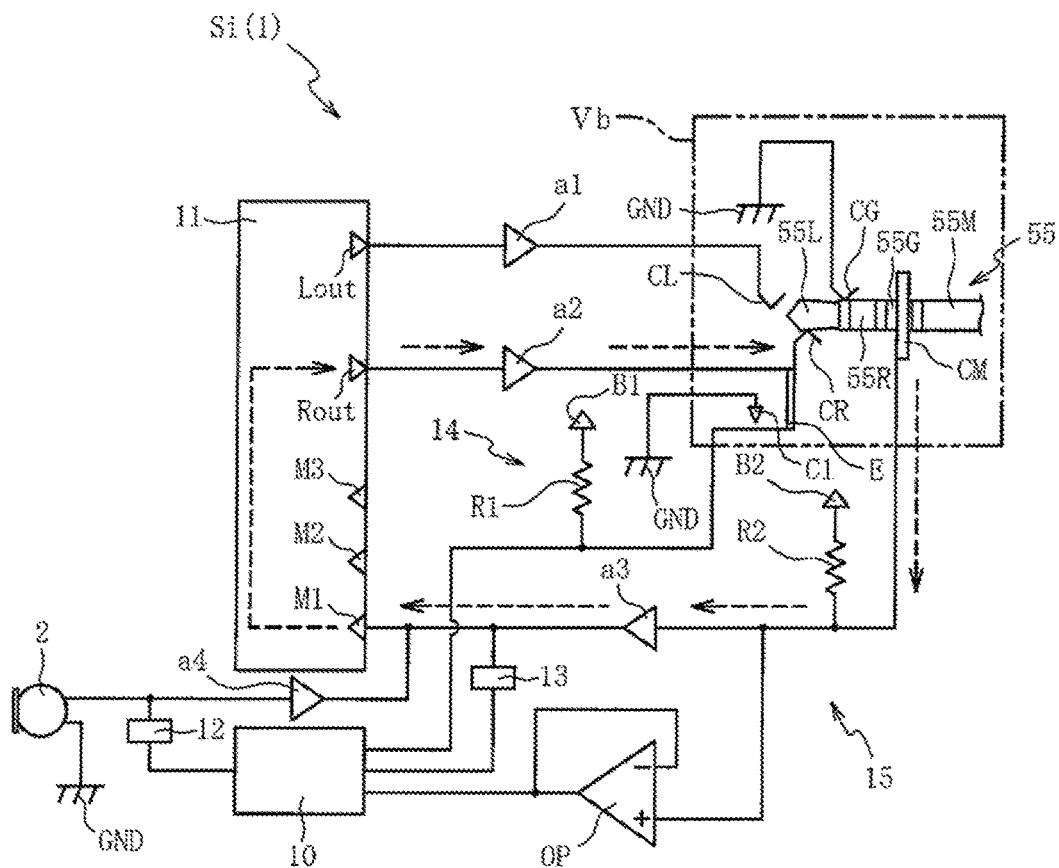
FIG. 5(a) is a circuit diagram of a sound input circuit in a case where the insertion of a plug into a jack is incomplete.
Figure 5B:
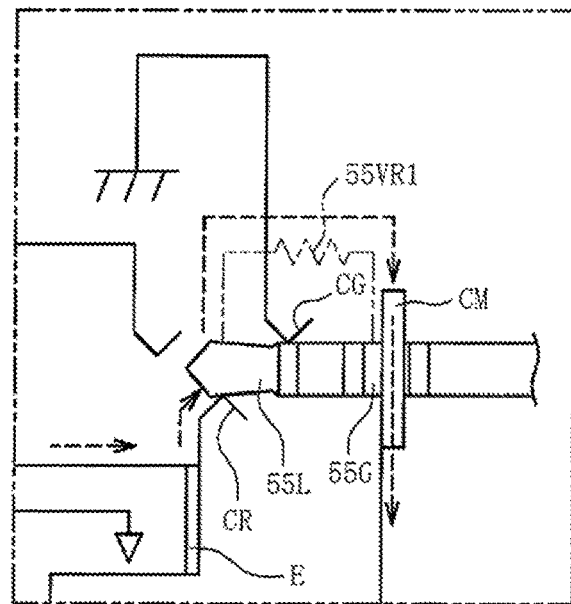
FIG. 5(b) is an enlarged view of a Vb portion in FIG. 5(a).

FIG. 5(a) is a circuit diagram of the sound input circuit Si in a case where the insertion of the plug 55 into the jack 7 is incomplete, and FIG. 5(b) is an enlarged view of a Vb portion in FIG. 5(a). While the plug 55 is extracted or inserted from or into the jack 7, the left terminal 55L, the right terminal 55R, and the ground terminal 55G of the plug 55 and the microphone terminal M are not completely connected to the left contact point CL, the right contact point CR, the ground contact point CG, and the microphone contact point CM of the jack 7, respectively, even though the plug 55 is inserted into the jack 7.

Particularly, as shown in FIG. 5(a), the left terminal 55L may be connected to the right contact point CR, the ground contact point CG may be connected to an insulator between the left terminal 55L and the right terminal 55R, and the ground terminal 55G may be connected to the microphone contact point CM. In such a case, a sound signal from the right output port Rout of the sound processing apparatus 11 is input to the left terminal 55L from the right contact point CR.

Here, as shown in FIG. 5(b), the left terminal 55L and the ground terminal 55G of the plug 55 are connected to each other through a virtual resistor 55VR1 based on the left speaker 50a (see FIGS. 1(a) and 1(b) and FIG. 2(a)). Therefore, a sound signal from the left terminal 55L is input to the ground terminal 55G through the resistor 55VR1, is input to the microphone contact point CM from the ground terminal 55G, and is input to the first input port M1 from the microphone contact point CM. As described above in FIG. 4(b), a sound signal which is input from the first input port M1 is output to the right output port Rout and input to the right contact point CR and the left terminal 55L again.

In this manner, a sound signal from the left terminal 55L is repeatedly input to the microphone contact point CM to cause "howling", and thus the sound signal becomes an improper sound signal including noise. Since such an improper sound signal is output to the left speaker 50a from the left terminal 55L, noise which is unpleasant for the user H is output from the left speaker 50a.

Consequently, in the present embodiment, in a case where the plug 55 is detected by the plug detection circuit 14 and the connection of the microphone contact point CM is detected by the HS microphone detection circuit 15, an improper sound signal which is input from the microphone contact point CM is blocked by operating the HS mute circuit for two seconds, and the output of noise to the user H due to the improper sound signal is curbed.

Referring back to FIG. 2(a), the addition buttons 3a to 3f mentioned above are respectively provided with an LED 3a1 to an LED 3f1. The LED 3a1 to the LED 3f1 are configured such that the turn-on and turn-off thereof are controllable, and the turn-on and turn-off of the LEDs 3a1 to 3f1 are controlled in response to a turn-on instruction or a turn-off instruction received from the portable terminal 30.

The portable terminal 30 includes a CPU 33, a flash ROM 34, and a RAM 35, which are connected to an input and output port 37 through a bus line 36. The communication apparatus 38 communicating with the communication apparatus 16 of the input and output IF 1, a wireless communication apparatus 39 performing wireless communication with an Internet NT and external camera 60, the built-in camera 31, the LCD 32, and a touch panel 40 are further connected to the input and output port 37.

Figure 8:
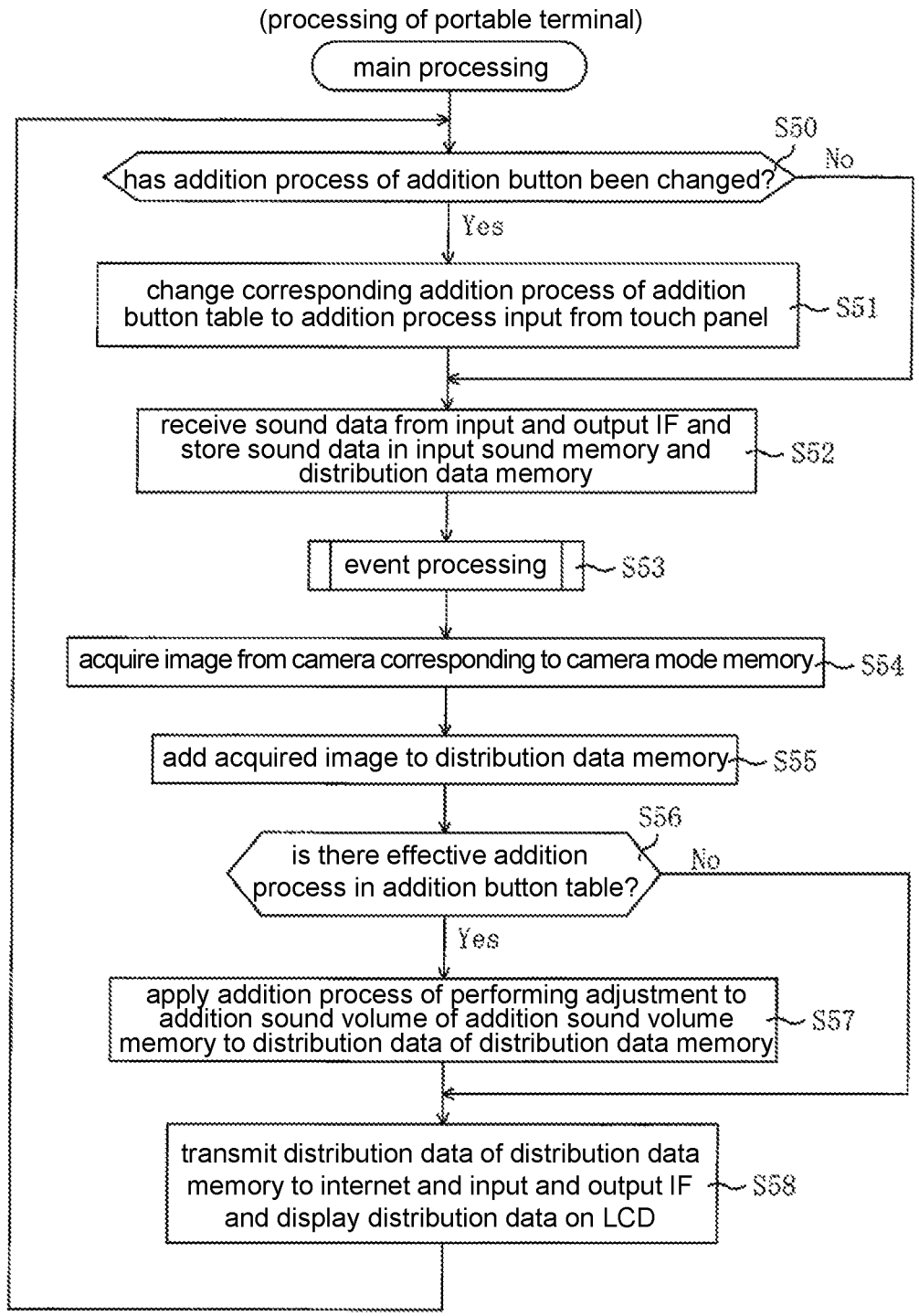
FIG. 8 is a flowchart of main processing in a portable terminal.

The CPU 33 is an arithmetic apparatus that controls each unit which is connected by the bus line 36. The flash ROM 34 is a rewritable non-volatile storage device that stores programs executed by a CPU 10, fixed value data, and the like, and stores a control program 34a and an addition button table 34b. When the control program 34a is executed by the CPU 33, main processing in FIG. 8 is executed. The addition button table 34b is a data table in which turn-on and turn-off states of the addition buttons 3a to 3f and allocated addition processes are stored. The addition button table 34b will be described with reference to FIG. 2(b).

FIG. 2(b) is a schematic diagram showing the addition button table 34b. As shown in FIG. 4(b), turn-on and turn-off states and addition processes in the addition buttons 3a to 3f and addition buttons 32a to 32f to be described later (see FIGS. 10(a) to 10(d)) and corresponding to the addition buttons 3a to 3f on the LCD 32 are stored in the addition button table 34b.

In FIG. 2(b), "BGM1" is allocated as an addition process of the addition buttons 3a and 32a, "moving image 1" is allocated as an addition process of the addition buttons 3b and 32b, "sound effect 1" is allocated as an addition process of the addition buttons 3c and 32c, "still image 1" is allocated as an addition process of the addition buttons 3d and 32d, "sound effect 2" which is a sound effect different from the "sound effect 1" is allocated as an addition process of the addition buttons 3e and 32e, and "text 1" is allocated as an addition process of the addition buttons 3f and 32f.

Referring back to FIG. 2(a), the RAM 35 is a rewritable memory that stores various work data, a flag, and the like when the CPU 33 executes the control program 34a, and is provided with an input sound memory 35a in which a sound received from the input and output IF 1 is stored, a distribution data memory 35b in which the above-described distribution data is stored, a camera mode memory 35c in which the above-described camera switching information received from the input and output IF 1 is stored, and an addition sound volume memory 35d in which the above-described addition sound volume received from the input and output IF 1 is stored.

The touch panel 40 is an input apparatus that inputs a touched positional signal to the portable terminal 30 in response to a touch operation of the user H, and the above-described LCD 32 and touch panel 40 are provided so as to be superimposed on each other.

Figures 6A, 6B:
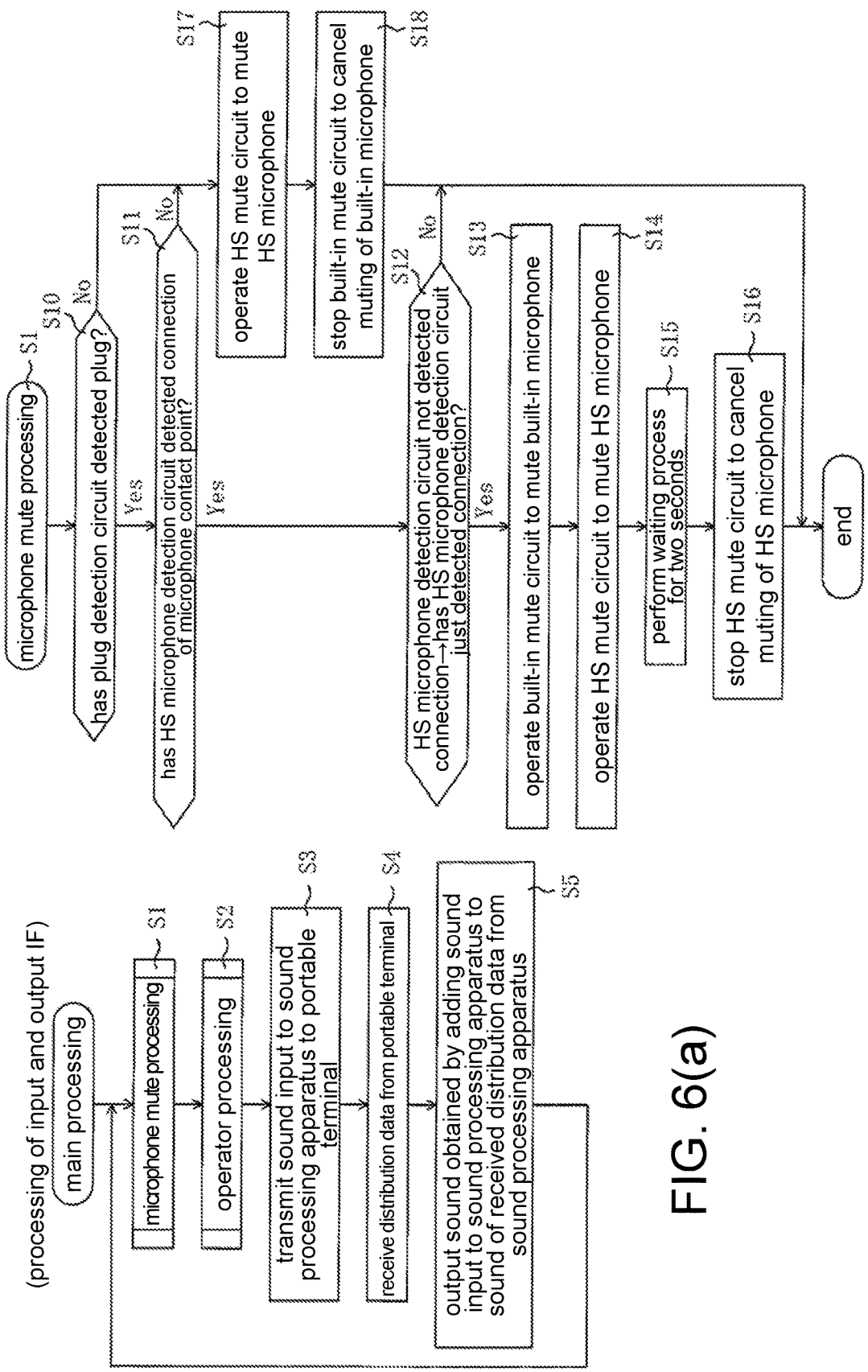
FIG. 6(a) is a flowchart of main processing in the input and output IF.
FIG. 6(b) is a flowchart of microphone mute processing in the input and output IF.

Next, a process executed by the MCU 10 of the input and output IF and a process executed by the CPU 33 of the portable terminal 30 will be described with reference to FIGS. 6(a) and 6(b) to FIGS. 10(a) to 10(d). FIG. 6(a) is a flowchart of main processing in the input and output IF 1. The main processing of the input and output IF 1 is processing executed after power is supplied to the input and output IF 1. First, the main processing of the input and output IF 1 performs microphone mute processing (S1). The microphone mute processing will be described with reference to FIG. 6(b).

FIG. 6(b) is a flowchart of microphone mute processing in the input and output IF 1. First, the microphone mute processing confirms whether or not the plug detection circuit 14 has detected the insertion of the plug 55 (S10). In the process of S10, in a case where the plug detection circuit 14 has detected the insertion of the plug 55 (S10: Yes), it is confirmed whether or not the HS microphone detection circuit 15 has detected the connection of the microphone contact point CM (S11).

In the process of S11, in a case where the HS microphone detection circuit 15 has detected the connection of the microphone contact point CM (S11: Yes), it is confirmed whether or not the HS microphone detection circuit 15 has just detected the connection of the microphone contact point CM (S12). Specifically, it is confirmed whether or not the connection of the microphone contact point CM has not been detected by the HS microphone detection circuit 15 in the previous microphone mute processing and the connection of the microphone contact point CM has been detected by the HS microphone detection circuit 15 in the present microphone mute process.

In the process of S12, in a case where the HS microphone detection circuit 15 has just detected the connection of the microphone contact point CM (S12: Yes), it is a timing when an input destination of a sound of the sound processing apparatus 11 is switched from the built-in microphone 2 to the HS microphone 50c, and thus the built-in mute circuit 12 is operated first, and the built-in microphone 2 is muted (S13).

After the process of S13 is performed, the HS mute circuit 13 is operated, a sound signal which is input from the microphone contact point CM is blocked from the first input port M1, and the HS microphone 50c is muted (S14). After the process of S14 is performed, a waiting process is performed for two seconds (S15), and thereafter, the HS mute circuit 13 is stopped to recover the input of a sound signal to the first input port M1 from the microphone contact point CM and cancel the muting of the HS microphone 50c (S16).

That is, when the HS microphone detection circuit 15 has just detected the connection of the microphone contact point CM (S11: Yes), the microphone contact point CM is not connected to the microphone terminal 55M of the plug 55 in the extraction and insertion of the plug 55 with respect to the jack 7 as described above in FIGS. 5(a) and 5(b), and thus there is a concern that the microphone contact point CM may be connected to another terminal such as the ground terminal 55G.

In such a case, it is possible to prevent an improper sound signal from the microphone contact point CM from being output from the left speaker 50a and the right speaker 50b of the headset 50 through the right output port Rout and the left output port Lout by blocking a sound signal input from the microphone contact point CM from the first input port M1 of the sound processing apparatus 11 for two seconds by the HS mute circuit 13. Thereby, it is possible to prevent unpleasant noise caused by the improper sound signal from being output to the user H.

In addition, a period of time from the blocking of the sound signal from the microphone contact point CM to the cancellation of the blocking is set to two seconds. Therefore, a period of time required for the extraction and insertion of the plug 55 with respect to the jack 7 is secured by such two seconds. Thus, even when an improper sound signal is input from the microphone contact point CM during the extraction and insertion, it is possible to sufficiently prevent the improper sound signal from becoming unpleasant noise and being output to the user H.

Here, since the microphone mute processing of S1 is repeatedly performed as will be described later, the HS microphone 50c is muted and the muting is cancelled two seconds later through S14 to S16 only just after the HS microphone detection circuit 15 has detected the connection of the microphone contact point CM (S12: Yes), so that it is possible to prevent the muting of the HS microphone 50c and the cancellation of muting from being repeatedly executed in a state where the connection of the microphone contact point CM has been detected.

In a case where the plug detection circuit 14 has not detected the insertion of the plug 55 in the process of S10 (S10: No) or in a case where the HS microphone detection circuit 15 has not detected the connection of the microphone contact point CM in the process of S11 (S11: No), it is a timing when an input destination of a sound of the sound processing apparatus 11 is switched from the HS microphone 50c to the built-in microphone 2 due to complete removal of the plug 55 from the jack 7, and thus the HS mute circuit 13 is operated to mute the HS microphone 50c (S17) and the built-in mute circuit 12 is stopped to cancel the muting of the built-in microphone 2 (S18).

In the process of S12, in a case where the HS microphone detection circuit 15 has not just detected the connection of the microphone contact point CM (S12: No), the processes of S13 to S16 are skipped. After the processes of S12, S16, and S18 are performed, the microphone mute processing (S1) is terminated, and the flowchart returns to the main processing of FIG. 6(a).

After the microphone mute processing (S1) of S1 is performed, operator processing (S2) is executed. The operator processing will be described with reference to FIG. 7.

Figure 7:
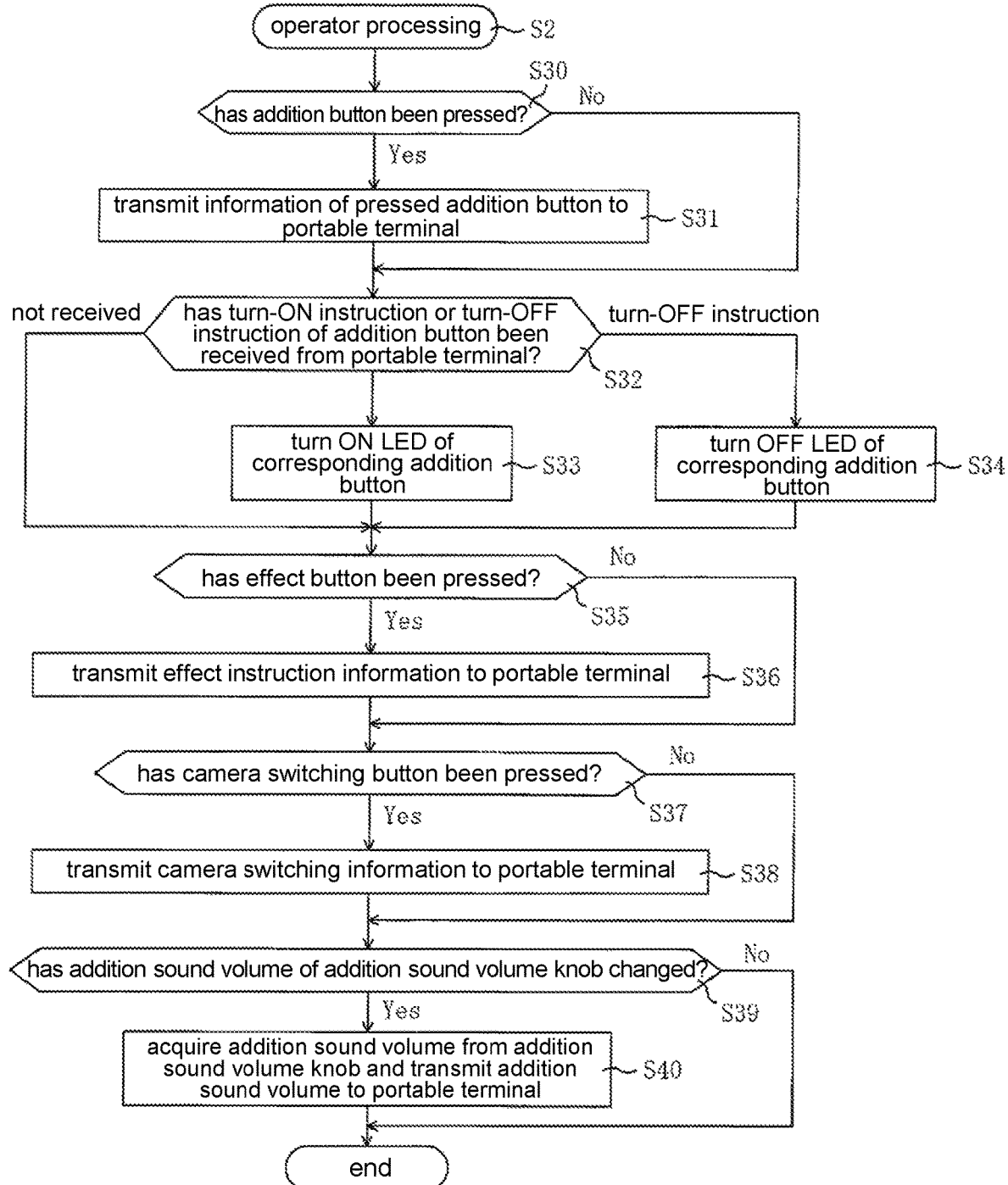
FIG. 7 is a flowchart of operator processing in the input and output IF.

FIG. 7 is a flowchart of operator processing in the input and output IF 1. In the operator processing, first, it is confirmed whether or not any one of the addition buttons 3a to 3f has been pressed (S30). In the process of S30, when the addition buttons 3a to 3f have been pressed (S30: Yes), pressing information of the pressed addition buttons 3a to 3f is transmitted to the portable terminal 30 (S31). In the process of S30, in a case where the addition buttons 3a to 3f have not been pressed (S30: No), the process of S31 is skipped.

After the processes of S30 and S31 are performed, it is confirmed whether or not a turn-on instruction or a turn-off instruction for the addition buttons 3a to 3f has been received from the portable terminal 30 (S32). In the process of S32, in a case where a turn-on instruction for the addition buttons 3a to 3f has been received (S32: "turn-on instruction"), the LEDs 3a1 to 3f1 of the addition buttons 3a to 3f for which a turn-on instruction has been given are turned on (S33). In a case where a turn-off instruction for the addition button 3 has been received (S32: "turn-off instruction"), the LEDs 3a1 to 3f1 for which a turn-off instruction has been given are turned off (S34). In the process of S32, in a case where a turn-on instruction or a turn-off instruction has not been received (S32: "not received"), the processes of S33 and S34 are skipped.

After the processes of S32 to S34 are performed, it is confirmed whether or not the effect button 4d has been pressed (S35). In the process of S35, in a case where the effect button 4d has been pressed (S35: Yes), effect instruction information is transmitted to the portable terminal 30 (S36). In a case where the effect button 4d has not been pressed (S35: No), the process of S36 is skipped.

After the processes of S35 and S36 are performed, it is confirmed whether or not the camera switching button 4a has been pressed (S37). In the process of S37, in a case where the camera switching button 4a has been pressed (S37: Yes), the above-described camera switching information is transmitted to the portable terminal 30 (S38). A setting value of the camera switching information transmitted in the process of S38 is switched whenever the camera switching button 4a is pressed, and specifically, switching is repeatedly performed in an order of "image acquisition from the built-in camera 31"→"image acquisition from the external camera 60"→"image acquisition is not performed", "image acquisition from the built-in camera 31"→ . . . . On the other hand, in a case where the camera switching button 4a has not been pressed (S37: No), the process of S38 is skipped.

After the processes of S37 and S38 are performed, it is confirmed whether or not a sound volume of the addition sound volume knob 5, that is, an addition sound volume has changed from the execution of the previous operator processing (S39). In the process of S39, in a case where the addition sound volume has changed (S39: Yes), the addition sound volume is transmitted to the portable terminal 30 (S40). In a case where the addition sound volume has not changed (S39: No), the process of S40 is skipped. After the processes of S39 and S40 are performed, the operator processing is terminated, and the flowchart returns to the main processing of FIG. 6(a).

After the operator processing of S2 is performed, a sound input to the sound processing apparatus 11, that is, a sound input from the HS microphone 50c of the headset 50 or the built-in microphone 2 is transmitted to the portable terminal 30 (S3). Meanwhile, in the process of S3, a sound input to the sound processing apparatus 11 may be transmitted to the portable terminal 30 without going through the MCU 10. After the process of S3 is performed, distribution data to be described later is received from the portable terminal 30 (S4).

After the process of S4 is performed, a sound obtained by adding a sound input by the sound processing apparatus 11 to a sound of the received distribution data is output from the sound processing apparatus 11 (S5). Specifically, a sound signal is extracted from the received distribution data and is input to the sound processing apparatus 11, and a sound signal obtained by mixing the sound signal and a sound signal input from the first input port M1 with each other is output from the left output port Lout and the right output port Rout in the sound processing apparatus 11. After the process of S5 is performed, the process of S1 and the subsequent processes are repeated.

Next, the processing of portable terminal 30 will be described with reference to FIG. 8 to FIGS. 10(a) to 10(d). FIG. 8 is a flowchart of main processing in the portable terminal 30. The main processing of the portable terminal 30 is executed in a case where an instruction for executing the control program 34a has been given from the touch panel 40.

In the main processing of the portable terminal 30, first, it is confirmed whether or not an instruction for changing an addition process of the addition button table 34b has been given from the touch panel 40 (S50). In the process of S50, in a case where an instruction for changing an addition process has been given (S50: Yes), the changed addition process acquired from the touch panel 40 is set to be an addition process of the corresponding addition buttons 3a to 3f and 32a to 32f of the addition button table 34b (S51). In the process of S50, in a case where an instruction for changing an addition process has not been given (S50: No), the process of S51 is skipped.

After the processes of S50 and S51 are performed, a sound is acquired from the input and output IF 1 and is stored in the input sound memory 35a and the distribution data memory 35b (S52). After the process of S52 is performed, event processing is executed (S53). The event processing will be described with reference to FIG. 9.

Figure 9:
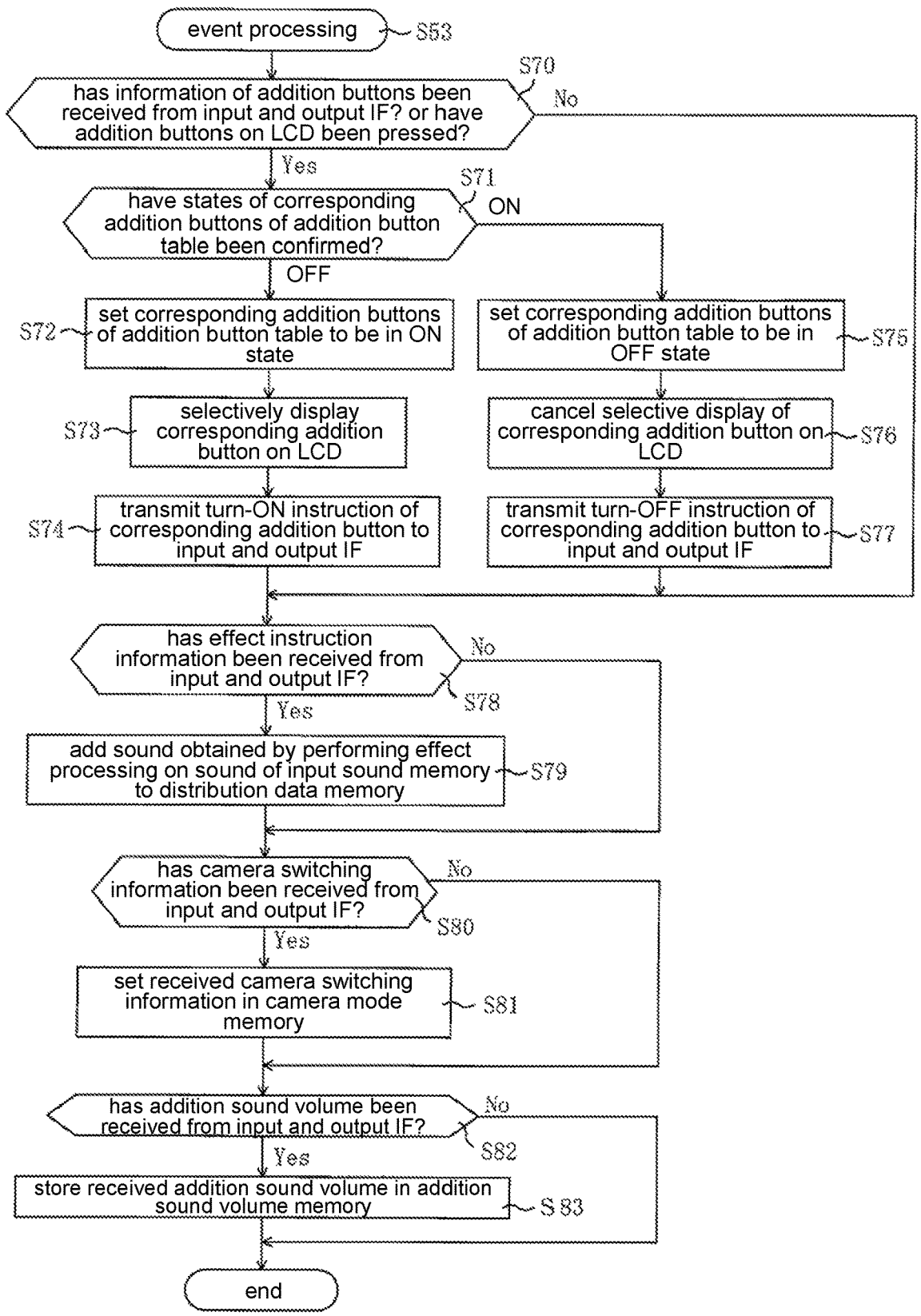
FIG. 9 is a flowchart of event processing in a portable terminal.

FIG. 9 is a flowchart of event processing in a portable terminal. In the event processing, first, it is confirmed whether or not pressing information of the addition buttons 3a to 3f has been received from the input and output IF 1 or the addition buttons 32a to 32f on the LCD 32 have been pressed in the touch panel 40 (S70). Here, a relationship between the addition buttons 3a to 3f of the input and output IF 1 and the addition buttons 32a to 32f on the LCD 32 will be described with reference to FIG. 10(a).

Figures 10A, 10B, 10C, 10D:
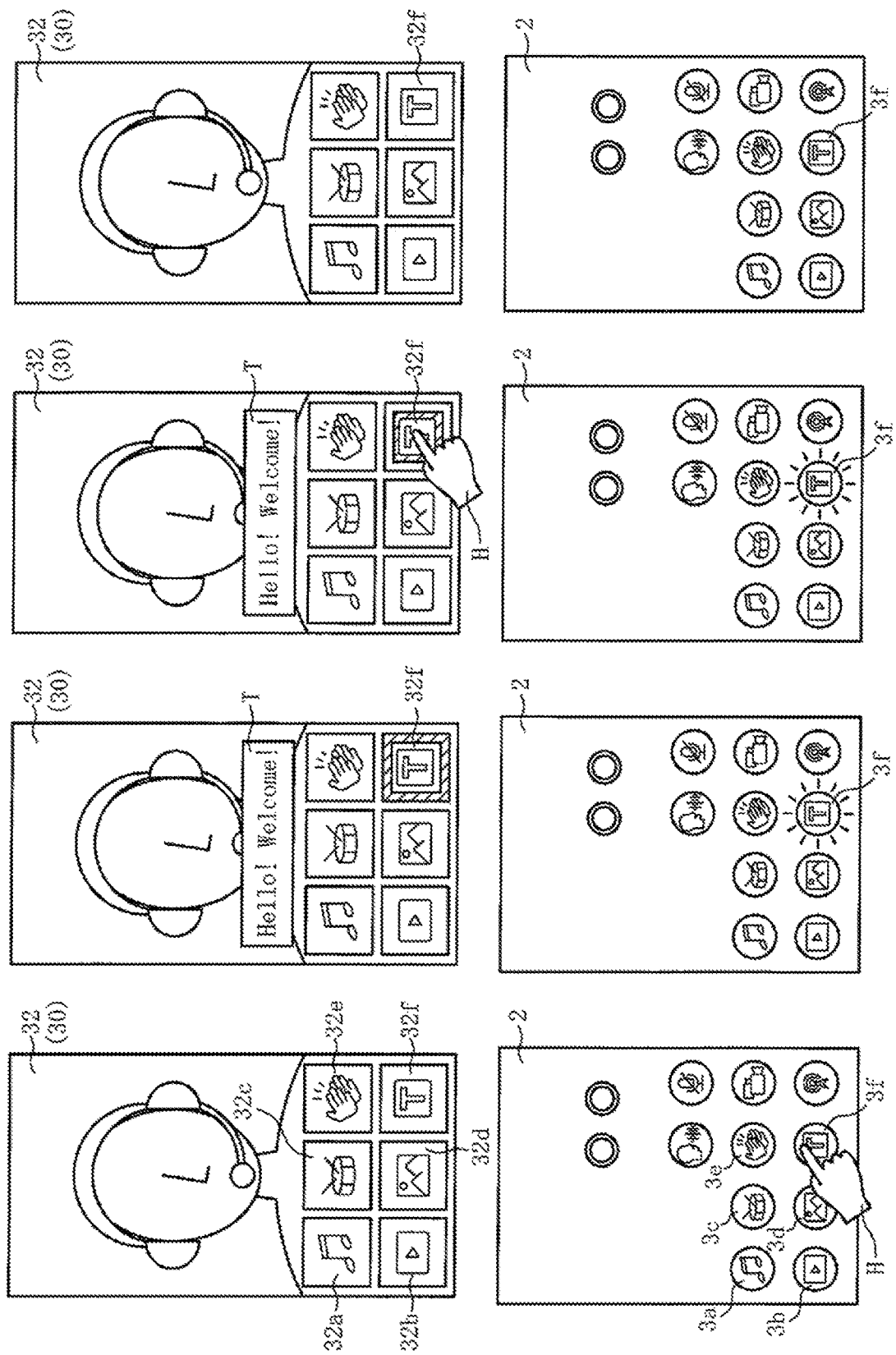
FIG. 10(a) is a diagram showing the input and output IF and an LCD of a portable terminal.
FIG. 10(b) is a diagram showing the input and output IF and the LCD of the portable terminal in a case where an addition button of the input and output IF is turned on, FIG. 10(c) a diagram showing the input and output IF and the LCD of the portable terminal in a case where a user operates the addition button of the LCD.
FIG. 10(d) is a diagram showing the input and output IF and the LCD of the portable terminal in a case where the addition button of the input and output IF is turned off.

FIG. 10(a) is a diagram showing the input and output IF 1 and the LCD 32 of the portable terminal 30. The addition buttons 32a to 32f are displayed below the LCD 32. The addition button 32a to the addition button 32f respectively correspond to the addition buttons 3a to 3f of the input and output IF 1 mentioned above. In the process of S70 in FIG. 9, the addition buttons 3a to 3f of the input and output IF 1 are pressed, so that it is confirmed whether or not pressing information has been transmitted in the process of S31 in FIG. 7 or whether or not the addition buttons 32a to 32f on the LCD 32 have been pressed through the touch panel 40.

Referring back to FIG. 9, in a case where pressing information of the addition buttons 3a to 3f has been received from the input and output IF 1 in the process of S70 or in a case where the addition buttons 32a to 32f on the LCD 32 have been pressed (S70: Yes), the states of the corresponding addition buttons 3a to 3f and 32a to 32f of the addition button table 34 are confirmed (S71).

In the process of S71, in a case where the corresponding addition buttons 3a to 3f and 32a to 32f of the addition button table 34 are in an off state (S71: "off"), the corresponding addition buttons 3a to 3f and 32a to 32f of the addition button table 34 are set to be in an on state (S72). In addition, the corresponding addition buttons 32a to 32f on the LCD 32 are selectively displayed (S73), and a turn-on instruction for the corresponding addition buttons 3a to 3f is transmitted to the input and output IF 1 (S74).

On the other hand, in the process of S71, in a case where the corresponding addition buttons 3a to 3f and 32a to 32f of the addition button table 34 are in an on state (S71: "on"), the corresponding addition buttons 3a to 3f and 32a to 32f of the addition button table 34 are set to be in an off state (S75), the selective display of the addition buttons 32a to 32f on the LCD 32 is cancelled (S76), and a turn-off instruction for the corresponding addition buttons 3a to 3f is transmitted to the input and output IF 1 (S77). The processes of S71 to S77 will be described again with reference to FIGS. 10(a) to 10(d).

FIG. 10(b) is a diagram showing the input and output IF 1 and the LCD 32 of the portable terminal 30 in a case where the addition button 3f of the input and output IF 1 is turned on, FIG. 10(c) is a diagram showing the input and output IF 1 and the LCD 32 of the portable terminal 30 in a case where the user H operates the addition button 32f of the LCD 32, and FIG. 10(d) is a diagram showing the input and output IF 1 and the LCD 32 of the portable terminal 30 in a case where the addition button 3f of the input and output IF 1 is turned off.

First, in FIG. 10(a), the user H applies text display processing allocated to the addition button 3f, and thus the user presses the addition button 3f of the input and output IF 1. Thereby, the addition buttons 3f and 32f of the addition button table 34 are set to be in an on state through the process of S72 of FIG. 9.

In addition, the addition button 32f on the LCD 32 corresponding to the addition button 3f is selectively displayed through the process of S73 (FIG. 10(b)). Text T is displayed on the LCD 32 through the process of S58 in FIG. 8 to be described later. Further, a turn-on instruction for the addition button 3f is transmitted to the input and output IF 1 through the process of S74 in FIG. 9, and the input and output IF 1 having received the turn-on instruction turns on the LED 3f1 of the addition button 3f through the process of S33 in FIG. 7. The user H can confirm that the text display processing has been applied from both the input and output IF 1 and the portable terminal 30 by the turn-on of the LED 3f1 of the addition button 3f and the selective display of the addition button 32f on the LCD 32.

Thereafter, since the user H cancels the text display processing, the addition button 32f on the LCD 32 is pressed (FIG. 10(c)). Thereby, the addition buttons 3f and 32f in the addition button table 34 are set to be in an off state through the process of S75 in FIG. 9, the selective display of the addition button 32f is cancelled through the process of S76 (FIG. 10(d)), and text T is set to be in a non-display state on the LCD 32 through the process of S58 in FIG. 8 to be described later. In addition, a turn-off instruction for the addition button 3f is transmitted to the input and output IF 1 through the process of S77 in FIG. 9, and the LED 3f1 is turned off through the process of S34 in FIG. 7.

Since turn-on and turn-off states of the addition buttons 3a to 3f and 32a to 32f are unitarily managed by the addition button table 34, it is possible to synchronize turn-on and turn-off states of addition processes allocated to the addition buttons 3a to 3f and 32a to 32f and the turn-on and turn-off states of the LEDs 3a1 to 3f1 of the addition buttons 3a to 3f corresponding thereto and the selective display states of the addition buttons 32a to 32f with each other. Thereby, even when the addition buttons 3a to 3f are pressed or the addition buttons 32a to 32f on the LCD 32 are pressed, the same operations are performed, and thus it is possible to improve usability of the input and output IF 1 and the portable terminal 30.

Referring back to FIG. 9, in a case where pressing information of the addition buttons 3a to 3f has not received from the input and output IF 1 and in a case where the addition buttons 32a to 32f on the LCD 32 have not been pressed in the process of S70 (S70: No), the processes of S71 to S77 are skipped.

After the processes of S70, S74, and S77 are performed, it is confirmed whether or not the above-described effect instruction information has been received from the input and output IF 1 (S78). In the process of S78, in a case where the effect instruction information has been received (S78: Yes), a sound obtained by performing effect (acoustic effect) processing such as a reverb or a delay on a sound of the input sound memory 35a to the distribution data memory 35b (S79). On the other hand, in a case where the effect instruction information has not been received (S78: No), the process of S79 is skipped.

After the processes of S78 and S79 are performed, it is confirmed whether or not the above-described camera switching information has been received from the input and output IF 1 (S80). In the process of S80, in a case where the camera switching information has been received (S80: Yes), the received camera switching information is stored in the camera mode memory 35c (S81). In the process of S80, in a case where the camera switching information has not been received (S80: No), the process of S81 is skipped.

After the processes of S80 and S81 are performed, it is confirmed whether or not an addition sound volume has been received from the input and output IF 1 (S82). In the process of S82, in a case where the addition sound volume has been received (S82: Yes), the received addition sound volume is stored in the addition sound volume memory 35d (S83). In a case where the addition sound volume has not been received (S82: No), the process of S83 is skipped. After the processes of S82 and S83 are performed, the event processing is terminated, and the flowchart returns to the main processing of FIG. 8.

After the event processing of S53 is performed, an image is acquired from a camera corresponding to the value of the camera mode memory 35c (S54). Specifically, an image is acquired from the built-in camera 31 in a case where "image acquisition from the built-in camera 31" is set in the camera mode memory 35c, and an image is acquired from the external camera 60 in a case where "image acquisition from the external camera 60" is set. On the other hand, in a case where "image acquisition is not performed", a black image, that is, a blank image is obtained instead of images acquired from the built-in camera 31 and the external camera 60. Such a value of the camera mode memory 35c is switched whenever the camera switching button 4a of the input and output IF 1 is pressed, and thus it is possible to easily change over an acquisition destination of an image without performing a complicated operation on the portable terminal 30.

After the process of S54 is performed, an image acquired in the process of S54 is added to the distribution data memory 35b (S55). After the process of S55 is performed, it is confirmed whether or not there is an effective addition process in the addition button table 34b, that is, an addition process which is set to be in an on state among the addition buttons 3a to 3f and 32a to 32f in the addition button table 34b (S56).

In the process of S56, in a case where there is an effective addition process (S56: Yes), an effective addition process is acquired from the addition button table 34b, and a sound volume of the addition process is adjusted to an addition sound volume of the addition sound volume memory 35d and is then applied to distribution data of the distribution data memory 35b (S57). On the other hand, in a case where there is no effective addition process in the process of S56 (S56: No), the process of S57 is skipped.

After the processes of S56 and S57 are performed, distribution data of the distribution data memory 35b is distributed on the Internet NT through the wireless communication apparatus 39 and transmitted to the input and output IF 1, and an image of the distribution data is displayed on the LCD 32 (S58). After the process of S58 is performed, the process of S50 and the subsequent processes are repeated.

A sound signal of the distribution data which is transmitted to the input and output IF 1 through the process of S58 is mixed with a sound input from the HS microphone 50c or the built-in microphone 2 and is output through the process of S5 in FIG. 6(a) described above. A processing time for applying an addition process or an effect is required until the sound input from the HS microphone 50c or the built-in microphone 2 is processed as distribution data in the portable terminal 30 and output to the input and output IF 1. Therefore, a latency (delay) occurs before a sound of distribution data based on the sound is output from the input and output IF 1 after the sound is input to the input and output IF 1.

Consequently, the sound input from the HS microphone 50c or the built-in microphone 2 is mixed with the sound signal of the distribution data and is output, so that even when an addition process or an effect is applied to the distribution data by the portable terminal 30, a sound input from the HS microphone 50c or the built-in microphone 2 at that point in time can be output through a monitor without causing a latency. Thereby, the user H can speak or sing without feeling uncomfortable by listening to such an output through the monitor.

At the same time, the sound signal of the distribution data is also output through the monitor, so that the user H can confirm a distribution data addition process and the degree of an effect at any time by confirming the output through the monitor. Since the outputs through the monitor can be performed by the same left speaker 50a and right speaker 50b, it is possible to improve usability of the input and output IF 1 and the portable terminal 30 by the user H.

Next, a second embodiment will be described with reference to FIGS. 11(a) and 11(b) to FIG. 13. In the above-described first embodiment, a sound signal input from the microphone contact point CM is blocked from the sound processing apparatus 11 by the HS mute circuit 13, so that an improper sound signal from the microphone contact point CM is prevented from being output from the right output port Rout and the left output port Lout of the sound processing apparatus 11.

On the other hand, in the second embodiment, a built-in microphone 2 and an HS microphone 50c are connected to different input ports in a sound processing apparatus 11, and an input port for inputting a sound to the sound processing apparatus 11 is appropriately switched, so that a sound signal which is input from a microphone contact point CM is prevented from being output from a right output port Rout and a left output port Lout. In the second embodiment, the same portions as those in the above-described first embodiment will be denoted by the same reference numerals and signs, and the description thereof will be omitted.

Figure 11A:
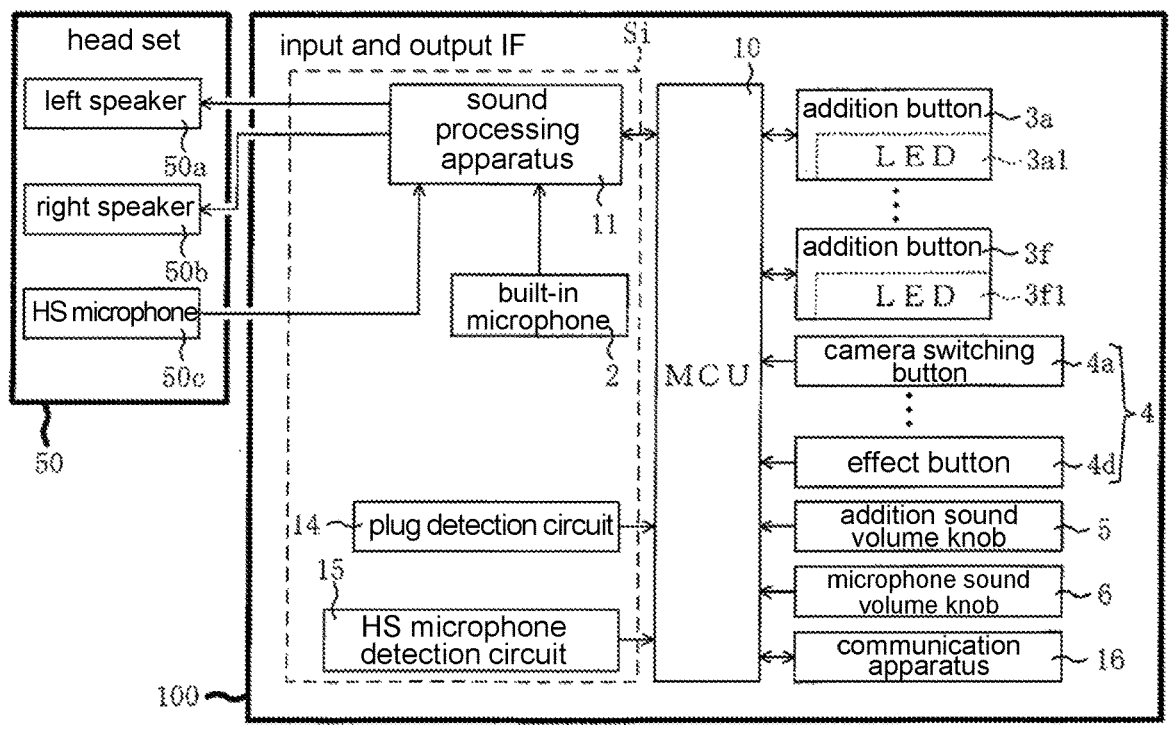
FIG. 11(a) is a block diagram showing an electrical configuration of an input and output IF in a second embodiment.
Figure 11B:
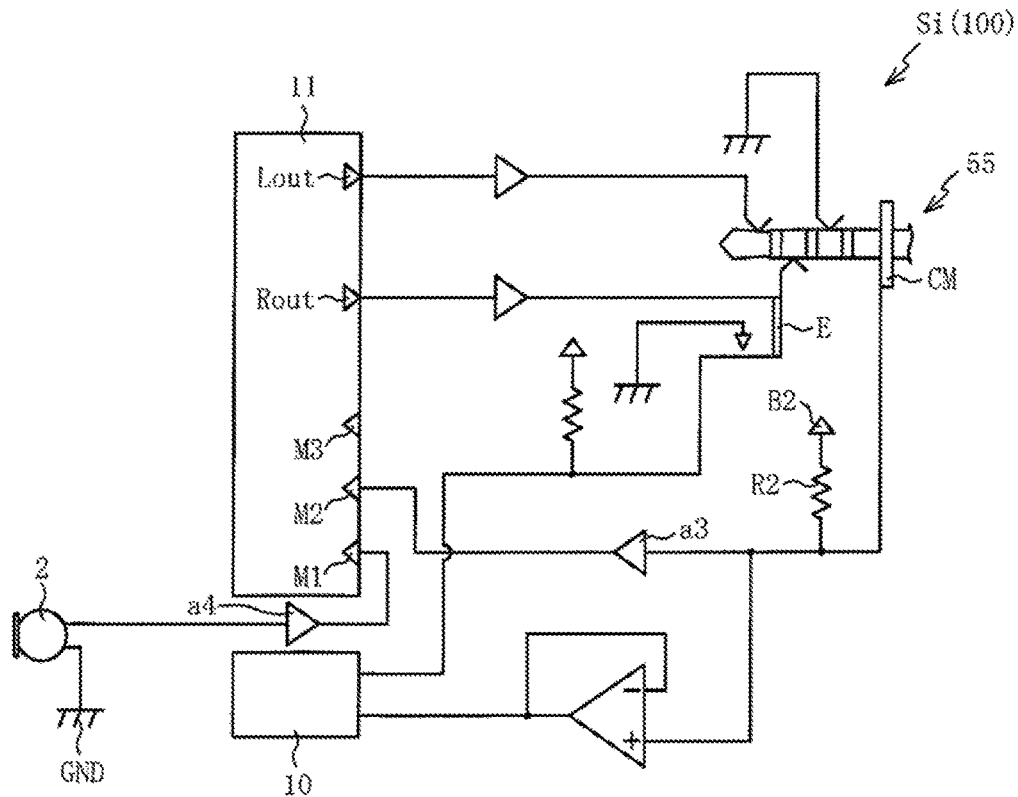
FIG. 11(b) is a circuit diagram of a sound input circuit in the second embodiment.

FIG. 11(a) is a block diagram showing an electrical configuration of an input and output IF 100 in the second embodiment, and FIG. 11(b) is a circuit diagram of a sound input circuit Si of the input and output IF 100 in the second embodiment. As shown in FIGS. 11(a) and 11(b), in the sound input circuit Si of the second embodiment, a built-in mute circuit 12 and an HS mute circuit 13 are omitted from the sound input circuit Si of the first embodiment in FIGS. 2(a) and 3(a). In addition, the built-in microphone 2 is connected to a first input port M1 of the sound processing apparatus 11 through an amplifier a4, and the microphone contact point CM is connected to a second input port M2 of the sound processing apparatus 11 through an amplifier a3. On the other hand, the built-in microphone 2, the microphone contact point CM, and other input apparatuses are not connected to a third input port M3.

Figure 12A:
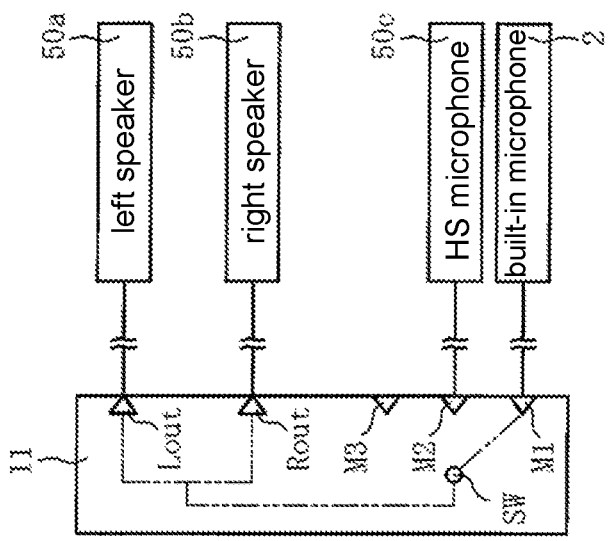
FIG. 12(a) is a schematic diagram showing a sound processing apparatus in a case where a sound signal is input from a built-in microphone.

Next, switching between input ports in the sound processing apparatus 11 will be described with reference to FIGS. 12(a) to 12(c). FIG. 12(a) is a schematic diagram showing the sound processing apparatus 11 in a case where a sound signal is input from the built-in microphone 2, FIG. 12(b) is a schematic diagram showing the sound processing apparatus 11 in a case where a sound signal is input from the HS microphone 50c, and FIG. 12(c) is a schematic diagram showing the sound processing apparatus 11 in a case where the input of a sound signal is blocked.

Figure 12B:
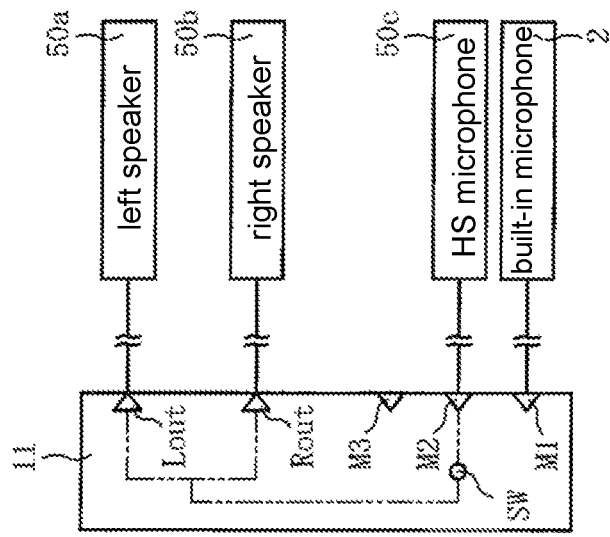
FIG. 12(b) is a schematic diagram showing the sound processing apparatus in a case where a sound signal is input from an HS microphone.
Figure 12C:
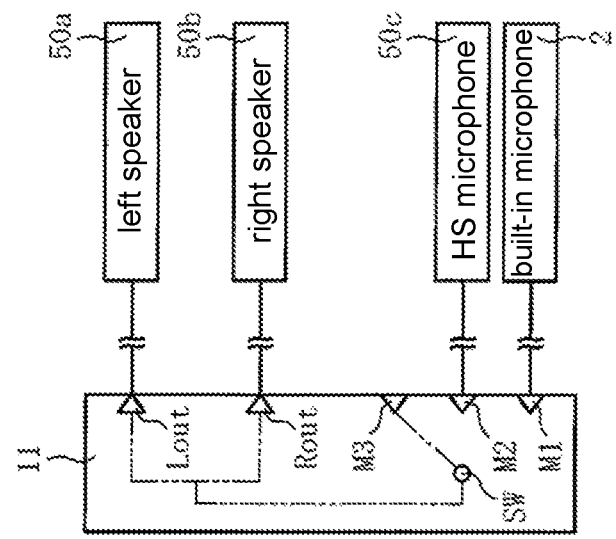
FIG. 12(c) is a schematic diagram showing the sound processing apparatus in a case where the input of a sound signal is blocked.

As shown in FIGS. 12(a) to 12(c), the sound processing apparatus 11 is provided with an input switching SW that switches an input port for inputting a sound signal from the sound processing apparatus 11 to one port among a first input port M1, a second input port M2, and a third input port M3.

In a case where the input switching SW is switched to the first input port M1 (FIG. 12(a)), a sound signal input from the built-in microphone 2 is input to the sound processing apparatus 11. In a case where the input switching SW is switched to the second input port M2 (FIG. 12(b)), a sound signal input from the HS microphone 50c is input to the sound processing apparatus 11. In a case where the input switching SW is switched to the third input port M3 (FIG. 12(c)), the input of a sound signal is blocked.

In the second embodiment, the input switching SW is appropriately changed over in microphone mute processing to be described later so as to perform switching between whether a sound signal is input to the sound processing apparatus 11 from the built-in microphone 2, whether a sound signal is input from the HS microphone 50c, and whether the input of a sound signal to the sound processing apparatus 11 is blocked.

Next, a flowchart of microphone mute processing of the input and output IF 100 in the second embodiment will be described with reference to FIG. 13. In the microphone mute processing of the second embodiment, in a case where an HS microphone detection circuit 15 has just detected the connection of the microphone contact point CM in the process of S12 (S12: Yes), the input port of the sound processing apparatus 11 is switched to the third input port M3 by the input switching SW (S100). Thereby, the input of a sound signal to the sound processing apparatus 11 is blocked, and the built-in microphone 2 and the HS microphone 50c are muted.

After the process of S100 is performed, a waiting process is performed for two seconds (S15), and thereafter, the input port of the sound processing apparatus 11 is switched to the second input port M2 by the input switching SW (S101). Thereby, a sound signal is input to the sound processing apparatus 11 from the microphone contact point CM, and thus only the muting of the HS microphone 50c is cancelled.

In the process of S12, in a case where the HS microphone detection circuit 15 has not just detected the connection of the microphone contact point CM (S12: No), the processes of S100 to S101 are skipped.

In the process of S11, in a case where the HS microphone detection circuit 15 has not just detected the connection of the microphone contact point CM (S11: No), the input port of the sound processing apparatus 11 is switched to the first input port M1 by the input switching SW (S102). Thereby, only the muting of the built-in microphone 2 is cancelled.

As described above, in the input and output IF 100 of the second embodiment, an input port for inputting a sound signal in the sound processing apparatus 11 is switched to the third input port M3 after the HS microphone detection circuit 15 has just detected the connection of the microphone contact point CM, so that a sound signal input from the microphone contact point CM is blocked. Thereby, it is possible to prevent an improper sound signal input from the microphone contact point CM from being output from a left speaker 50a and a right speaker 50b of a headset 50.

In this manner, the blocking of a sound signal input from the microphone contact point CM can be realized by only switching an input port for inputting a sound signal inside the sound processing apparatus 11. Thereby, it is not necessary to provide another circuit or apparatus such as the built-in mute circuit 12 or the HS mute circuit 13 in the first embodiment, and thus manufacturing costs of the input and output IF 100 can be reduced.

Although description has been given on the basis of the above-described embodiments, it can be easily inferred that various improvements and modifications can be made.

In the above-described embodiment, a sound signal input from the microphone contact point CM is blocked, so that an improper sound signal is prevented from being output from the left speaker 50a and the right speaker 50b of the headset 50 through the right output port Rout and the left output port Lout. However, the disclosure is not necessarily limited thereto, and a sound signal output from the right output port Rout and the left output port Lout is blocked from the left contact point CL and the right contact point CR, so that an improper sound signal may be prevented from being output from the left speaker 50a and the right speaker 50b of the headset 50.

In such a case, for example, as in the first embodiment, the same circuit as the HS mute circuit 13 is provided between the right output port Rout and the left output port Lout and between the left contact point CL and the right contact point CR, so that a sound signal output from the right output port Rout and the left output port Lout may be blocked from the left contact point CL and the right contact point CR.

In addition, as in the second embodiment, an output port in the sound processing apparatus 11 is switched to an output port different from the right output port Rout and the left output port Lout, so that a sound signal output from the right output port Rout and the left output port Lout may be blocked from the left contact point CL and the right contact point CR.

In the above-described embodiment, in the process of S58 in FIG. 8, distribution data of the distribution data memory 35b is transmitted to the input and output IF 1 as it is. However, the disclosure is not necessarily limited thereto, and distribution data obtained by excluding a sound of the input sound memory 35a from the distribution data of the distribution data memory 35b may be transmitted to the input and output IF 1 in the process of S58. Thereby, in the process of S5 of the input and output IF 1 in FIG. 6(a), in a case where a sound input by the sound processing apparatus 11 is mixed with a sound of distribution data and is output, the same sound as the sound input by the sound processing apparatus 11 is excluded, and thus it is possible to curb a situation where the same sound as a sound input by the sound processing apparatus 11 is output twice.

In the above-described embodiment, distribution data created by the portable terminal 30 is distributed to the Internet NT, but the disclosure is not limited thereto. For example, distribution data may be stored in the flash ROM 34 or the RAM 35 of the portable terminal 30. Further, the distribution data stored in the flash ROM 34 or the RAM 35 may be edited and then distributed to the Internet NT.

In the above-described embodiment, the input and output IFs 1 and 100 are provided with the built-in microphone 2 and are configured such that the HS microphone 50c can be connected thereto. However, the disclosure is not necessarily limited thereto, and a configuration may be adopted in which the built-in microphone 2 is omitted from the input and output IFs 1 and 100, a sound is input from only the HS microphone 50c, and another sound input apparatus different from the HS microphone 50c can be connected to the input and output IFs 1 and 100.

Figure 13:
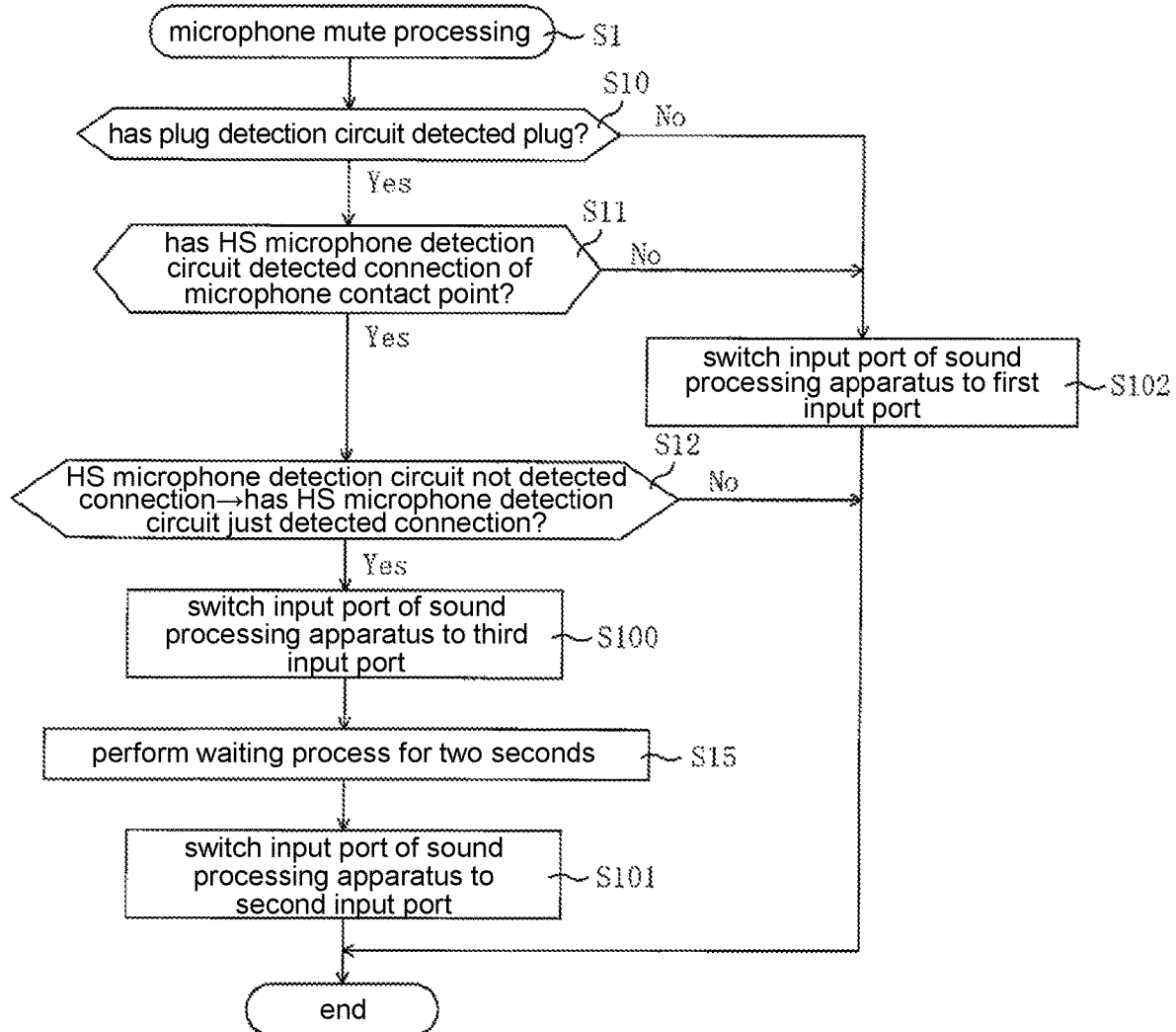
FIG. 13 is a flowchart of microphone mute processing of the input and output IF in the second embodiment.

In the above-described embodiment, a waiting process is performed for two seconds in the process of S15 in FIG. 6(*b*) and FIG. 13. However, a period of time for which a waiting process is performed is not limited to two seconds and may be two seconds or more or two seconds or less. However, it is preferable that the period of time be limited to a period of time between one second and two seconds.

In the above-described embodiment, a configuration is adopted in which an image is acquired from either the built-in camera 31 or the external camera 60 in the portable terminal 30, but the disclosure is not limited thereto. An image may be acquired from both the built-in camera 31 and the external camera 60, and an image obtained by lining two acquired images up may be used to create distribution data.

In the above-described embodiment, the addition buttons 3a to 3f are provided with the LEDs 3a1 to 3f1. However, the disclosure is not limited thereto, and the LEDs 3a1 to 3f1 may be omitted from the addition buttons 3a to 3f. In addition, the camera switching button 4a, the distribution start button 4b, the mute button 4c, and the effect button 4d may be provided with an LED, and the turn-on or turn-off thereof may be switched in accordance with the states of the buttons.

In the above-described embodiment, the portable terminal 30 which is a smartphone is described as an example of an information processing apparatus (distribution apparatus). However, the disclosure is not limited thereto, and other information processing apparatuses such as a tablet terminal and a personal computer may be used.

In the above-described embodiment, the input and output IFs 1 and 100 are provided with the sound input circuit Si, but the disclosure is not limited thereto. For example, the sound input circuit Si may be provided in any of other apparatuses, such as a mobile phone and a portable electronic game machine, which input a sound through the plug 55 of the headset 50.

In the above-described embodiment, a terminal of a CTIA standard is described as an example of the plug 55, but the disclosure is not limited thereto. For example, a terminal of an open mobile terminal platform (OMTP) standard may be used, or terminals of other standards may be used.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A distribution assistance apparatus that instructs a distribution apparatus connected to an Internet and performing Internet distribution of a sound or a video to perform various distribution instructions and performs Internet distribution using the distribution apparatus, the distribution assistance apparatus comprising:
   a sound input unit that inputs a sound;
   a sound transmission unit that transmits the sound input to the sound input unit to the distribution apparatus;
   an effect instruction unit that is an effect button, configured to be pressed so as to instruct the distribution apparatus to apply an effect processing on the sound transmitted from the sound transmission unit to the distribution apparatus and perform Internet distribution of the sound;
   a sound reception unit that receives a sound signal on which the effect processing has been performed by the distribution apparatus in response to an instruction of the effect instruction unit; and
   a sound output unit that outputs the sound signal received by the sound reception unit and the sound input to the sound input unit from the distribution assistance apparatus.

2. The distribution assistance apparatus according to claim 1, further comprising:
   a musical sound output instruction unit that instructs a piece of music or a musical sound of a sound effect to be output to the distribution apparatus through Internet distribution; and
   a sound volume adjustment unit that adjusts a sound volume of the musical sound which is instructed to be output to the distribution apparatus by the musical sound output instruction unit,
   wherein the sound reception unit receives the musical sound, as the sound signal, which is instructed to be output to the distribution apparatus by the musical sound output instruction unit and of which a sound volume is adjusted by the sound volume adjustment unit, and
   the sound output unit outputs the sound signal received by the sound reception unit from the distribution assistance apparatus.

3. The distribution assistance apparatus according to claim 1, wherein
   the distribution apparatus is configured to be capable of distributing images input from two or more cameras provided inside or outside the distribution apparatus through Internet distribution, and
   the distribution assistance apparatus further comprises a camera switching instruction unit that instructs switching of a camera to be used for Internet distribution to the distribution apparatus.

4. The distribution assistance apparatus according to claim 1, further comprising:
   a distribution start instruction unit that instructs start of Internet distribution,
   a moving image output instruction unit that instructs output of a moving image through Internet distribution,
   a still image output instruction unit that instructs output of a still image through Internet distribution, and
   a character string display instruction unit that instructs display of a character string through Internet distribution as distribution instructions given to the distribution apparatus,
   wherein an instructing function of each of the distribution start instruction unit, the moving image output instruction unit, the still image output instruction unit and the character string display instruction unit is visually displayed.

5. The distribution assistance apparatus according to claim 1, wherein the distribution apparatus is a portable terminal capable of processing a sound or a video.

6. The distribution assistance apparatus according to claim 1, wherein the sound input unit comprises a built-in microphone and a jack into which a plug for inputting and outputting a sound signal is inserted.

7. The distribution assistance apparatus according to claim 1, wherein the sound transmission unit comprises a communication apparatus communicating with the distribution apparatus.

8. The distribution assistance apparatus according to claim 1, wherein the sound reception unit comprises a communication apparatus communicating with the distribution apparatus.

9. The distribution assistance apparatus according to claim 1, wherein the sound output unit comprises a jack into which a plug for inputting and outputting a sound signal is inserted.

10. A distribution assistance method executed by a distribution assistance apparatus that instructs a distribution apparatus connected to an Internet and performing Internet distribution of a sound or a video to perform various distribution instructions and performs Internet distribution using the distribution apparatus, the distribution assistance method comprising:
   a sound input step of inputting a sound;
   a sound transmission step of transmitting the sound input through the sound input step to the distribution apparatus;
   an effect instruction step of pressing an effect instruction unit that is an effect button so as to instruct the distribution apparatus to apply an effect processing on the sound transmitted to the distribution apparatus through the sound transmission step and perform Internet distribution of the sound;
   a sound reception step of receiving a sound signal on which the effect processing has been performed by the distribution apparatus in response to an instruction given through the effect instruction step; and
   a sound output step of outputting the sound signal received through the sound reception step and the sound input through the sound input step from the distribution assistance apparatus.

11. The distribution assistance method according to claim 10, further comprising:
   a musical sound output instruction step of instructing a piece of music or a musical sound of a sound effect to be output to the distribution apparatus through Internet distribution; and
   a sound volume adjustment step of adjusting a sound volume of the musical sound which is instructed to be output to the distribution apparatus through the musical sound output instruction step, wherein the sound reception step comprises receiving the musical sound, as the sound signal, which is instructed to be output to the distribution apparatus through the musical sound output instruction step and of which a sound volume is adjusted through the sound volume adjustment step, and
   the sound output step comprises outputting the sound signal received in the sound reception step from the distribution assistance apparatus.

12. The distribution assistance method according to claim 10, wherein
   the distribution apparatus is configured to be capable of distributing images input from two or more cameras provided inside or outside the distribution apparatus through Internet distribution, and
   the distribution assistance method further comprises a camera switching instruction step of instructing switching of a camera to be used for Internet distribution to the distribution apparatus.

13. The distribution assistance method according to claim 10, further comprising:
   a distribution start instruction step of instructing start of Internet distribution,
   a moving image output instruction step of instructing output of a moving image through Internet distribution,
   a still image output instruction step of instructing output of a still image through Internet distribution, and
   a character string display instruction step of instructing display of a character string through Internet distribution as distribution instructions given to the distribution apparatus,
   wherein an instructing function of each of the distribution start instruction step, the moving image output instruction step, the still image output instruction step and the character string display instruction step is visually displayed.

14. The distribution assistance method according to claim 10, wherein the distribution apparatus is a portable terminal capable of processing a sound or a video.

15. The distribution assistance method according to claim 10, wherein the sound input step is performed by a built-in microphone of the distribution assistance apparatus or by inserting a plug for inputting and outputting a sound signal into a jack of the distribution assistance apparatus.

16. The distribution assistance method according to claim 10, wherein the sound transmission step is performed through communication with the distribution apparatus.

17. The distribution assistance method according to claim 10, wherein the sound reception step is performed through communication with the distribution apparatus.

18. The distribution assistance method according to claim 10, wherein the sound output step is performed by inserting a plug for inputting and outputting a sound signal into a jack of the distribution assistance apparatus.

* * * * *